US012586347B2

(12) United States Patent
Pan et al.

(10) Patent No.: US 12,586,347 B2
(45) Date of Patent: Mar. 24, 2026

(54) SCALABLE PIPELINE FOR MACHINE LEARNING-BASED BASE-VARIANT GROUPING

(71) Applicant: Walmart Apollo, LLC, Bentonville, AR (US)

(72) Inventors: Yanxin Pan, Sunnyvale, CA (US); Swagata Chakraborty, Campbell, CA (US); Ekaterina Pirogova, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/908,565

(22) Filed: Oct. 7, 2024

(65) Prior Publication Data

US 2025/0029364 A1     Jan. 23, 2025

Related U.S. Application Data

(63) Continuation of application No. 17/589,768, filed on Jan. 31, 2022, now Pat. No. 12,112,520, which is a
(Continued)

(51) Int. Cl.
*G06V 10/762*      (2022.01)
*G06N 3/045*      (2023.01)
(Continued)

(52) U.S. Cl.
CPC ......... *G06V 10/7625* (2022.01); *G06N 3/045* (2023.01); *G06V 10/7747* (2022.01); *G06V 10/82* (2022.01)

(58) Field of Classification Search
CPC ..... G06V 10/7625; G06V 10/82; G06N 3/045
See application file for complete search history.

(56) References Cited

U.S. PATENT DOCUMENTS 9,177,059 B2     11/2015  Musgrove et al.
9,646,262 B2      5/2017  Phillipps et al.
(Continued)

OTHER PUBLICATIONS

"FAISS: A library for efficient similarity search", Engineering at Meta https://engineering.fb.com/2017/03/29/data-infrastructure/faiss-a-library-for-efficient-similarity-search, Mar. 29, 2017 (Year: 2017).*
(Continued)

*Primary Examiner* — Apu M Mofiz
*Assistant Examiner* — Farhad Agharahimi
(74) *Attorney, Agent, or Firm* — DICKINSON WRIGHT RLLP; Hector A. Agdeppa

(57)     ABSTRACT

A system comprises one or more processors and non-transitory computer-readable media storing computing instructions that, when executed, perform operations comprising: generating an adjacency list for candidate items using a distance threshold with the maximum allowable neighbor distance equal to a Siamese model cut-off. The operations can also comprise loading data for the candidate items in the adjacency list and generating graphs of the candidate items in the adjacency list. The operations further can comprise determining, using breakdown logic, first graphs of the graphs that exceed a predetermined size, and building hierarchy dendrograms of nested subclusters of the first graphs. The operations additional can comprise determining cut-off values based on p-th percentiles of density for the first graphs, and identifying recommended variant groups of the candidate item in the nested subclusters of the hierarchy dendrograms below the cut-off values. Other embodiments are disclosed.

20 Claims, 10 Drawing Sheets

Related U.S. Application Data continuation-in-part of application No. 16/779,473, filed on Jan. 31, 2020, now Pat. No. 11,977,561.

(51) Int. Cl.
  *G06V 10/774* (2022.01)
  *G06V 10/82* (2022.01)

(56) References Cited

U.S. PATENT DOCUMENTS

| | | | |
|---|---|---|---|
| 9,953,357 B2 | 4/2018 | Ainsworth, III et al. | |
| 10,387,900 B2 | 8/2019 | Bledsoe et al. | |
| 10,664,512 B1 | 5/2020 | He et al. | |
| 11,250,042 B2 | 2/2022 | Chang et al. | |
| 11,675,766 B1 | 6/2023 | Chen | |
| 2011/0264641 A1 | 10/2011 | Yang et al. | |
| 2012/0124060 A1 | 5/2012 | Muskal et al. | |
| 2013/0060662 A1* | 3/2013 | Carlson | G06Q 30/06 705/26.61 |
| 2014/0122294 A1* | 5/2014 | Chen | G06Q 30/0609 705/26.35 |
| 2015/0039473 A1 | 2/2015 | Hu et al. | |
| 2015/0199324 A1 | 7/2015 | Nishioka | |
| 2015/0269494 A1* | 9/2015 | Kardes | G06F 16/355 706/12 |
| 2015/0379117 A1* | 12/2015 | Kalinin | G16B 40/30 707/737 |
| 2016/0071233 A1* | 3/2016 | Macko | G06T 11/206 345/440 |
| 2016/0078507 A1 | 3/2016 | Shivaswamy et al. | |
| 2016/0148222 A1 | 5/2016 | Davar et al. | |
| 2016/0189286 A1 | 6/2016 | Zohar et al. | |
| 2016/0196350 A1 | 7/2016 | Mau | |
| 2017/0193545 A1 | 7/2017 | Zhou et al. | |
| 2018/0218429 A1 | 8/2018 | Guo et al. | |
| 2019/0065589 A1 | 2/2019 | Wen et al. | |
| 2019/0236130 A1 | 8/2019 | Li et al. | |
| 2019/0370879 A1* | 12/2019 | Bhattacharjee | G06N 3/045 |
| 2019/0377825 A1 | 12/2019 | Chang et al. | |
| 2020/0311108 A1 | 10/2020 | Kumar et al. | |
| 2020/0334809 A1* | 10/2020 | Vianu | G06V 30/1916 |
| 2021/0049664 A1 | 2/2021 | Lundgaard et al. | |
| 2021/0073890 A1 | 3/2021 | Lee et al. | |
| 2021/0264203 A1* | 8/2021 | Fuxman | G06F 18/24 |

OTHER PUBLICATIONS

Sharma, R., et al., "Retrieving Similar E-Commerce Images Using Deep Learing," arXiv:1901.03546v1 [cs.CV] Jan. 11, 2014, 9 pgs Jan. 11, 2019.

Shah, K., et al., "Neural Network Based Extreme Classification and Similarity Models for Product Matching," Proceedings of NAACL-HLT 2018, pp. 8-15, New Orleans, LA, Jun. 1-6, 2018. 2017 Association of Computational Linguistics Jun. 1, 2018.

Konraosson, S., Variant Dimenstion Group, Quick Guide, LS Retail NAV 6.3, Jan. 3, 2011, 7 pgs. Jan. 3, 2011.

Yuan "Matching Recommendations based on Siamese Network and Metric Learning", IEEE, 2018 (Year: 2018) 2018.

Carlo Valle, "Parallel Approach for Ensemble Learning with Locally Coupled Neural Networks", 2010 (Year:2010) 2101.

* cited by examiner

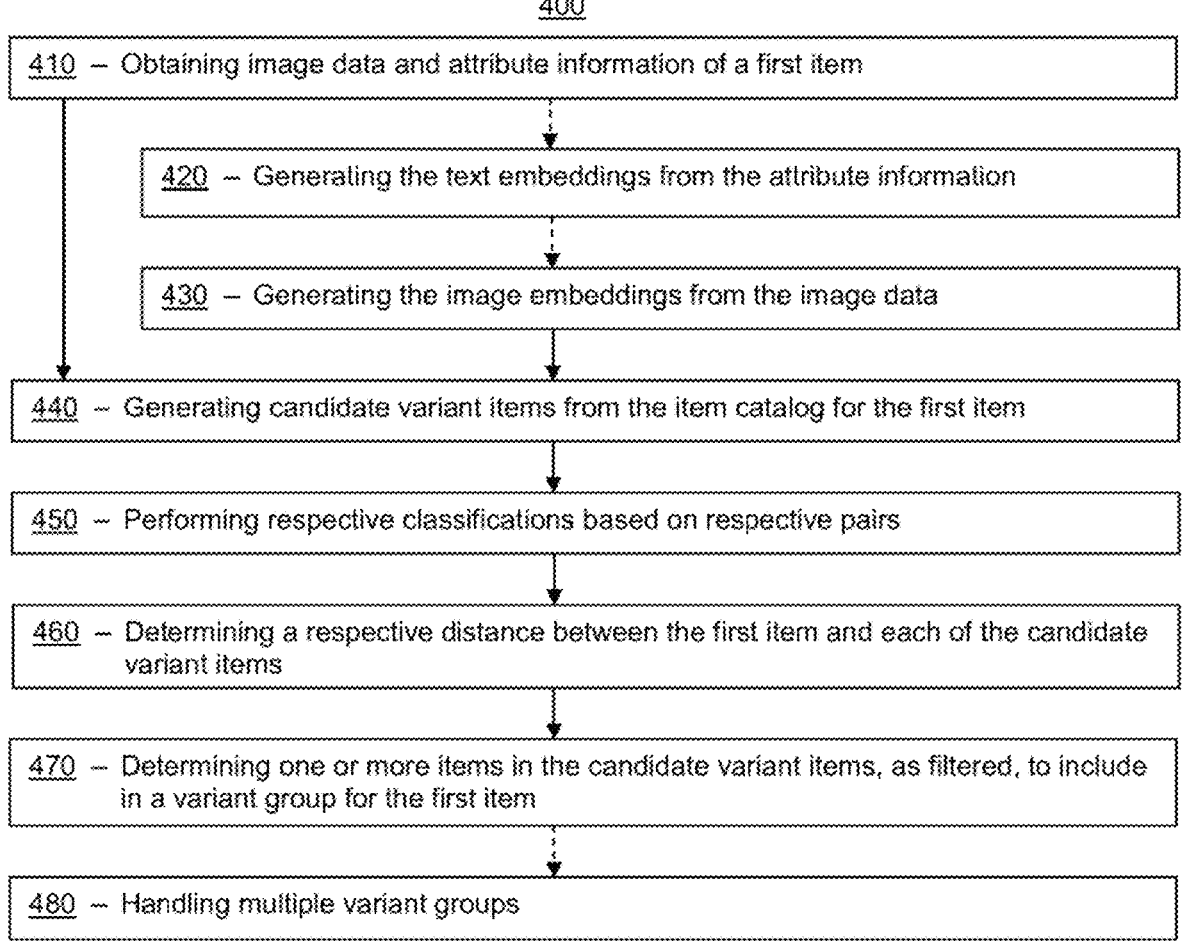

400

410 — Obtaining image data and attribute information of a first item

420 — Generating the text embeddings from the attribute information

430 — Generating the image embeddings from the image data

440 — Generating candidate variant items from the item catalog for the first item 450 — Performing respective classifications based on respective pairs 460 — Determining a respective distance between the first item and each of the candidate variant items 470 — Determining one or more items in the candidate variant items, as filtered, to include in a variant group for the first item 480 — Handling multiple variant groups

Build hierarchy tree/dendrogram (using average linkage from distance matrix) — 1020

Sort the linkage distances/height of the branches in dendrogram — 1030

Based on size bucket → assign percentile {p} to cut the tree — 1040

Compute cut-off threshold (d) = Max (RECALL-CAP {r}, distance value corresponding {p}) — 1050

Cut the hierarchy tree at computed cut off threshold — 1060

SUGGESTED VARIANT GROUPS — 1070

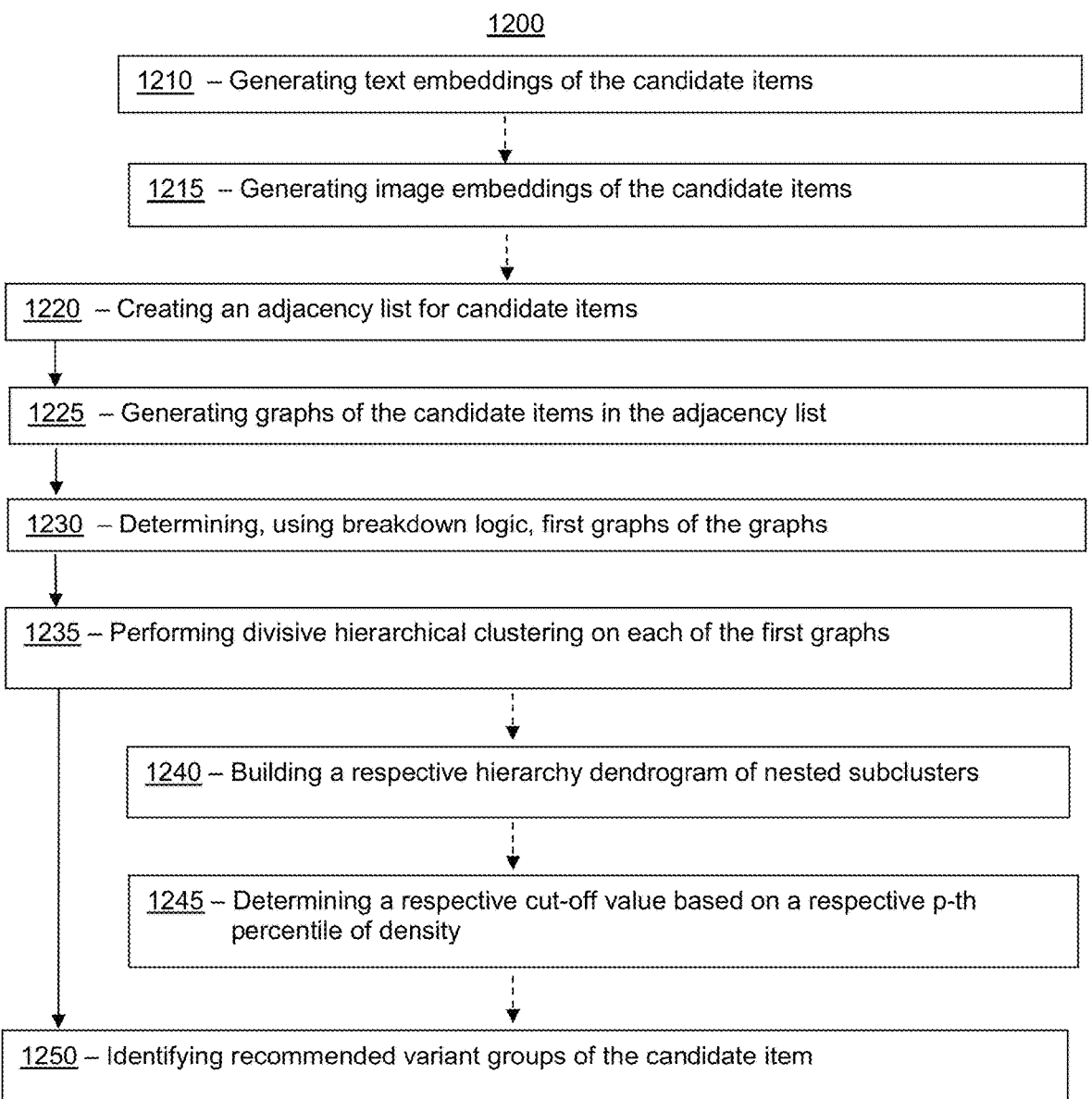

1200

1210 – Generating text embeddings of the candidate items

1215 – Generating image embeddings of the candidate items

1220 – Creating an adjacency list for candidate items

1225 – Generating graphs of the candidate items in the adjacency list

1230 – Determining, using breakdown logic, first graphs of the graphs

1235 – Performing divisive hierarchical clustering on each of the first graphs

1240 – Building a respective hierarchy dendrogram of nested subclusters

1245 – Determining a respective cut-off value based on a respective p-th percentile of density 1250 – Identifying recommended variant groups of the candidate item

FIG. 11

SCALABLE PIPELINE FOR MACHINE LEARNING-BASED BASE-VARIANT GROUPING

CROSS-REFERENCE TO RELATED APPLICATIONS

This application is a continuation of U.S. patent application Ser. No. 17/589,768, filed on Jan. 31, 2022, which is a continuation-in-part of U.S. patent application Ser. No. 16/779,473, filed on Jan. 31, 2020, which issued as U.S. Pat. No. 11,977,561, each of which are incorporated herein by reference in their entirety.

TECHNICAL FIELD

This disclosure relates generally to a scalable pipeline for machine learning-based base-variant grouping.

BACKGROUND

Items in an online items catalog can be variants each other. For example, certain models of T-shirts can be offered in multiple different size and/or colors. Such variants are sometimes not grouped together in a variant group.

BRIEF DESCRIPTION OF THE DRAWINGS

To facilitate further description of the embodiments, the following drawings are provided in which:

FIG. 4 illustrates a flow chart for a method, according to an embodiment;

FIG. 11 illustrates a flow chart for a method of automatically generating variant groups from a scalable pipeline using machine learning-based base-variant grouping, according to another embodiment.

Figure 1:
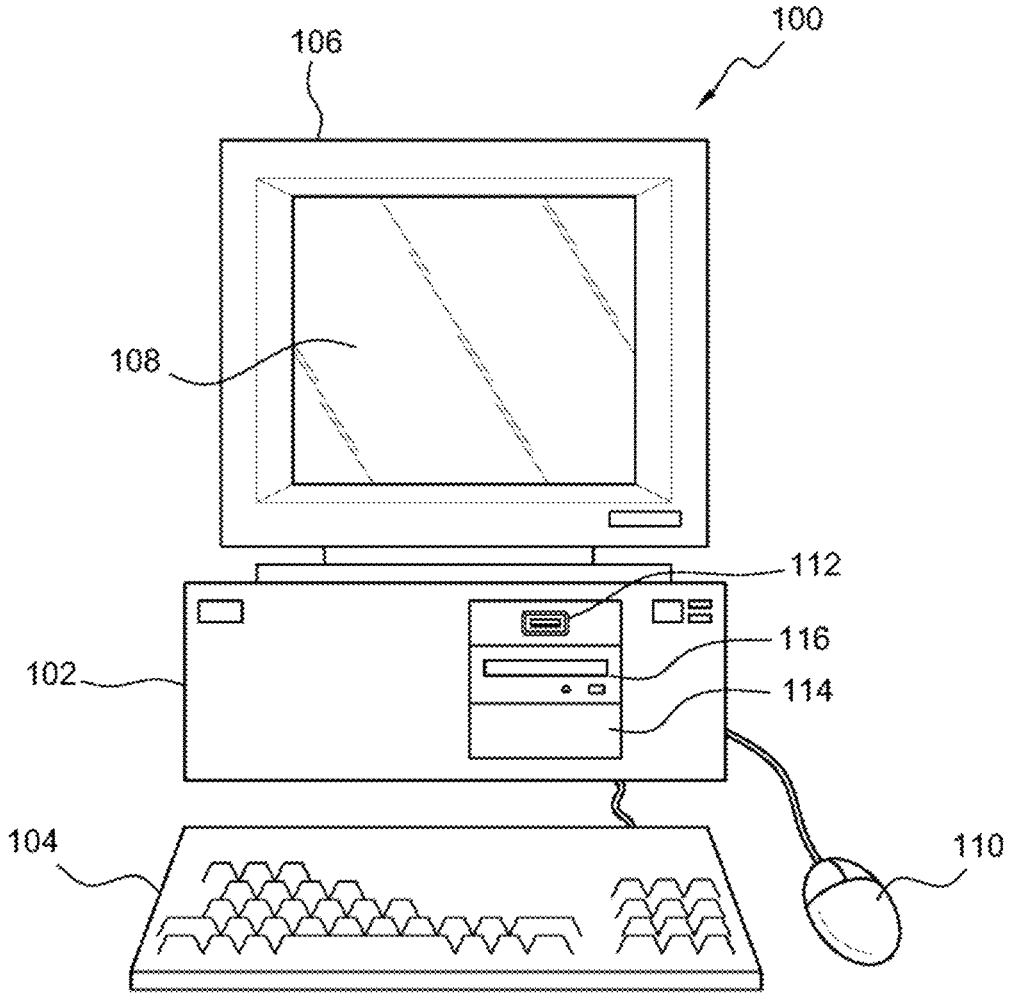
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
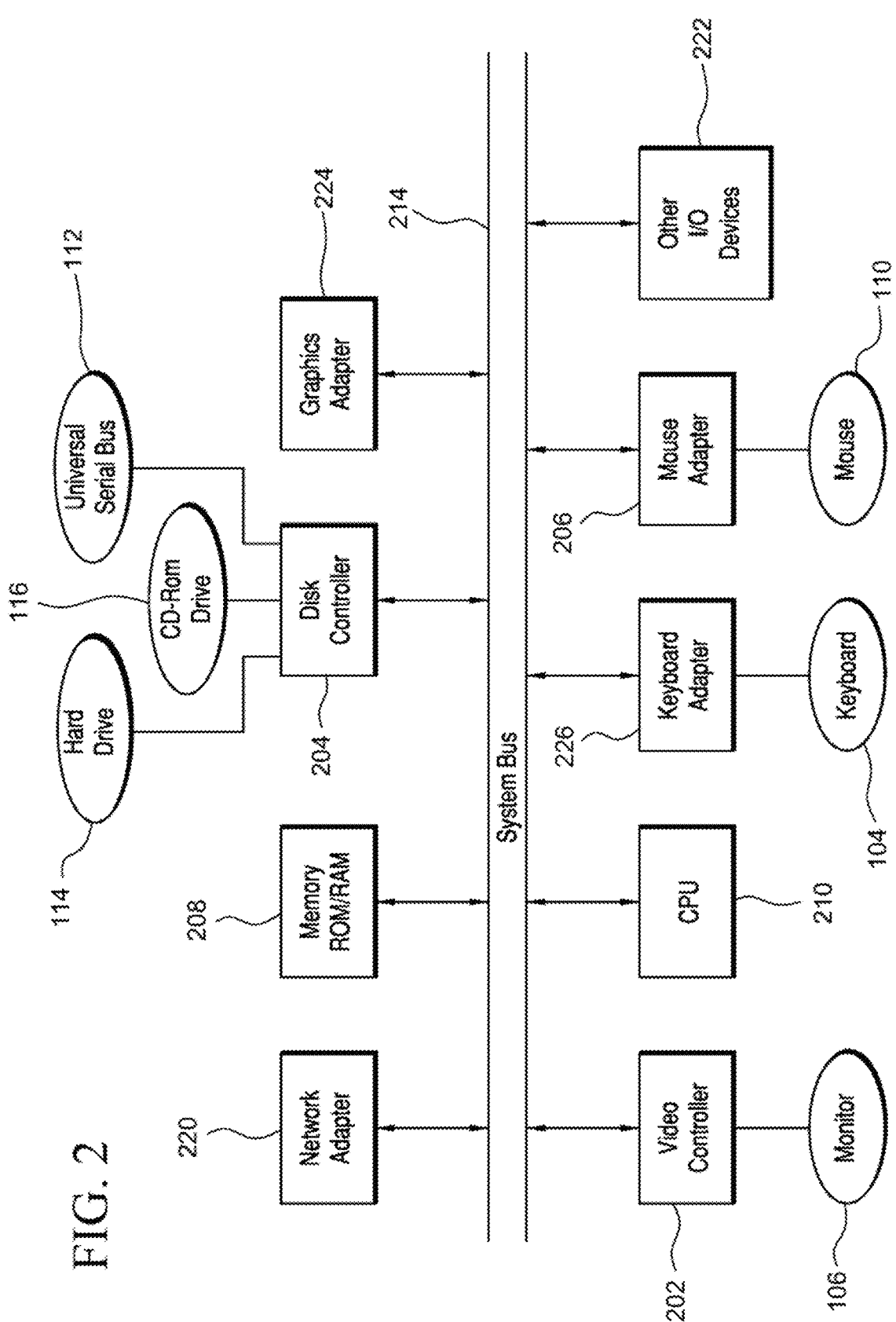
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Nonvolatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIGS. 1-2). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
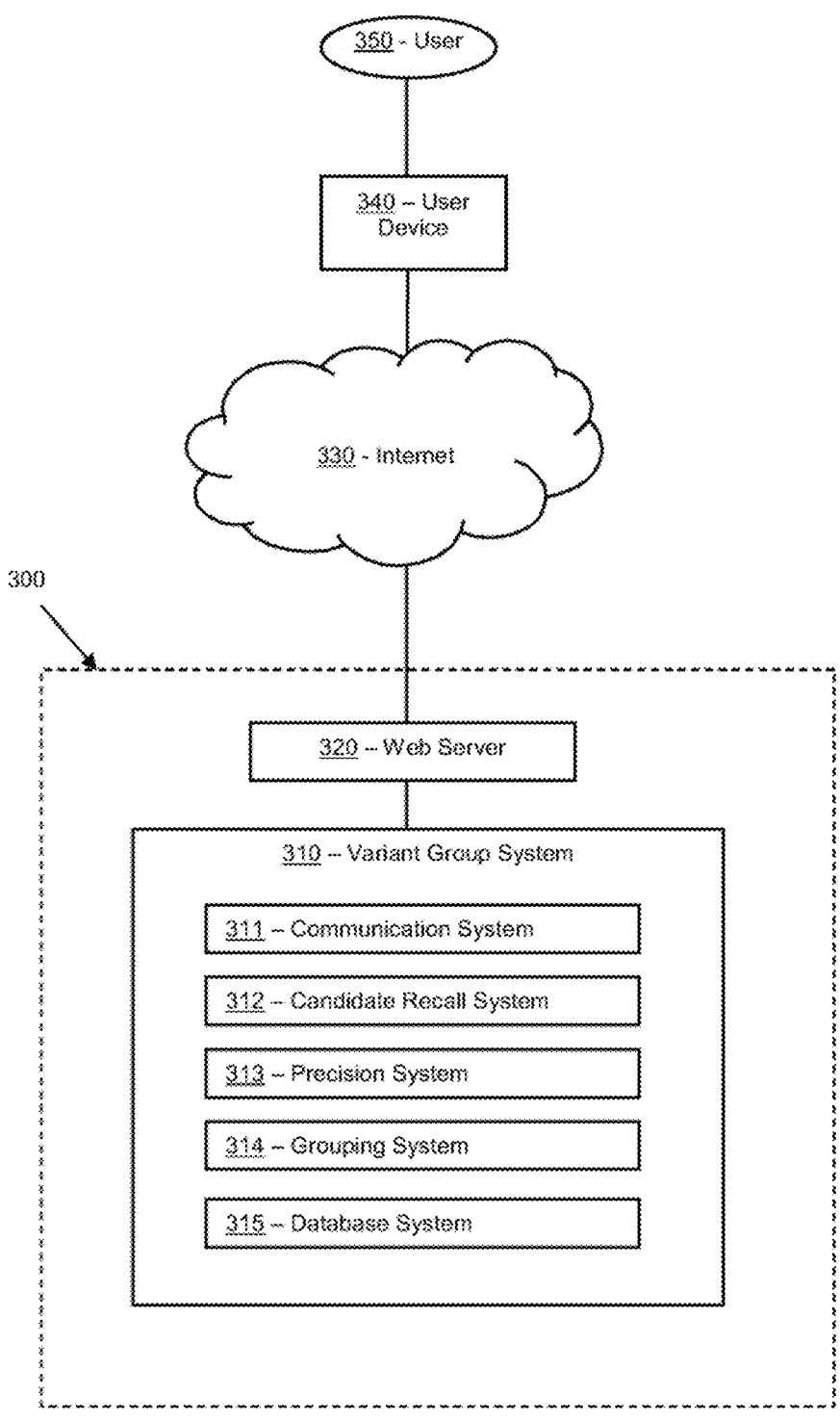
FIG. 3 illustrates a block diagram of a system that can be employed for automatically determining items to include in a variant group, according to an embodiment.

Turning ahead in the drawings, FIG. 3 illustrates a block diagram of a system 300 that can be employed for automatically determining items to include in a variant group, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a variant group system 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Variant group system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host variant group system 310 and/or web server 320. Additional details regarding variant group system 310 and/or web server 320 are described herein.

In some embodiments, web server 320 can be in data communication through Internet 330 with one or more user devices, such as a user device 340. User device 340 can be part of system 300 or external to system 300. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users to browse and/or search for items (e.g., products), to add items to an electronic cart, and/or to purchase items, in addition to other suitable activities. In a number of embodiments, web server 320 can host a website, or provide a server that interfaces with an application, on user device 340, which can allow other users, such as source (e.g., suppliers), to upload information about items that are being sold through web server 320. For example, users 340 can upload items and/or item information (e.g., attribute values for items), such that the items can be sold using web server 320.

In some embodiments, an internal network that is not open to the public can be used for communications between variant group system 310 and web server 320 within system 300. Accordingly, in some embodiments, variant group system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, a mobile device, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, variant group system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG.

1). The input device(s) and the display device(s) can be coupled to variant group system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of variant group system 310 and/or web server 320. In a similar manner, the processors and/or the non-transitory computer-readable media can be local and/or remote to each other.

Meanwhile, in many embodiments, variant group system 310 and/or web server 320 also can be configured to communicate with one or more databases, such as a database system 315. The one or more databases can include a product database that contains information about products, items, or SKUs (stock keeping units), for example, including attribute names and attribute values, among other information, as described below in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, variant group system 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, variant group system 310 can include a communication system 311, a candidate recall system 312, a precision system 313, a grouping system 314, and/or database system 315. In many embodiments, the systems of variant group system 310 can be modules of computing instructions (e.g., software modules) stored at non-transitory computer readable media that operate on one or more processors. In other embodiments, the systems of variant group system 310 can be implemented in hardware. Variant group system 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host variant group system 310 and/or web server 320. Additional details regarding variant group system 310 the components thereof are described herein.

In many embodiments, variant group system 310 can use machine learning models to automatically create and/or suggest base variant groups from items provided by one or more sources (e.g., supplier), which can advantageously assist users in selecting items from among variants. When a source uploads an item, it generally provides an identifier global trade identifier (GTID), universal product code (UPC), and/or other identifier, which can be a unique identifier for identifying the idem. Such identifiers can be designed to be unique for each product. When multiple sources provide the same item, a tenant can be the combination of the sources that provide the item. Variants of an item, such as size and/or color variants, can be designed to not be included as the same item and/or same tenant. It can be advantageous to include variants of an item in a base variant group. When an item is shown on a webpage provided by web server 320 to a user (e.g., a customer), it can be beneficial to show variants of the item on the same page, so that the user can readily select among the items in the base variant group, such as among different colors or sizes of the item.

For online shopping platforms that host a large number of items, such as over 200 million unique items, the scale of the item catalog can be massive. With hundreds or thousands of updates to the items being received daily, groups of humans are unable to review and validate groupings for base variant groups. In many embodiments, variant group system 310 can provide a technology-based solution to automatically determine items to include in a variant group. These variant groups can be suggested to groups of humans to review, and/or can be used without human review.

Turning ahead in the drawings, FIG. 4 illustrates a flow chart for a method 400, according to an embodiment. In some embodiments, method 400 can be a method of automatically determining items to include in a variant group. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), variant group system 310 (FIG. 3), and/or web server 320 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300. The processor(s) can be similar or identical to the processor(s) described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Figure 5:
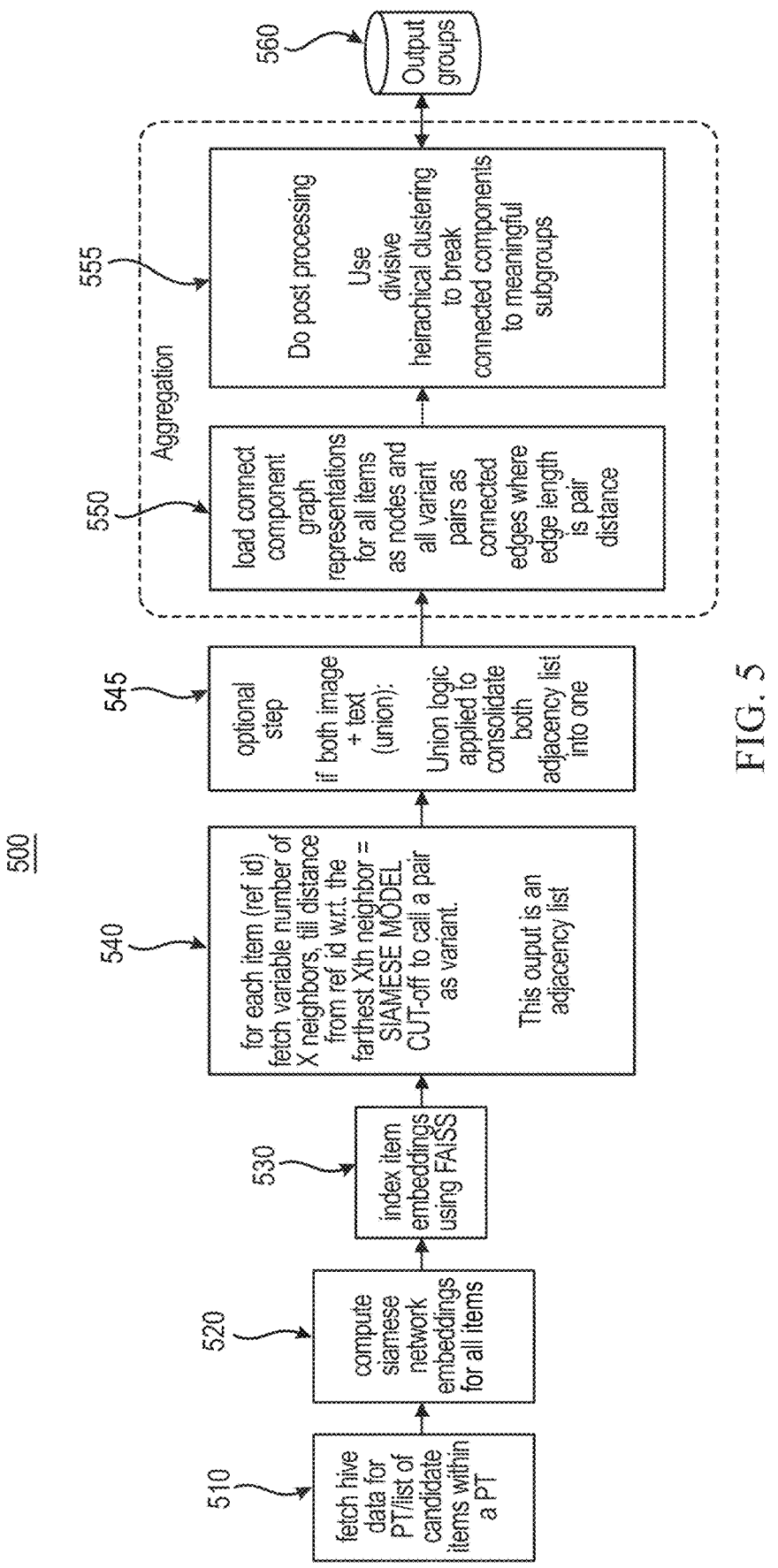
FIG. 5 illustrates a flow chart for a method of automatically generating variant suggestions based on machine learning models, according to an embodiment.

Referring to FIG. 4, method 400 can include a block 410 of obtaining image data and attribute information of a first item in an item catalog. In several embodiments, block 410 can be similar or identical to the activities described below in block 510 (FIG. 5). For example, an item in an item catalog can include one or more images that are associated with the item and/or attribute information, such as product type, brand, size, color, and/or other suitable attribute values.

In some embodiments, method 400 optionally can include one or more pre-processing activities, such as blocks 420 and 430, described below. In other embodiments, method 400 can continue after block 410 with a block 440, described below.

In a number of embodiments, method 400 optionally can include block 420 of generating text embeddings from the attribute information of the first item. In many embodiments, the text embeddings can be generated using an LSTM (long short-term memory) model, such as in a recurrent neural network (RNN). The LSTM model can convert one or more of the pieces of attribute information (e.g., product type, brand, size, color, etc.) into text embeddings in the LSTM feature space. In several embodiments, the attribute information for other items in the item catalog can be similarly pre-processed to generate text embeddings for those items, which can be used in block 440, described below. In some embodiments, block 420 can be similar or identical to the activities described below in blocks 520 and/or 540 (FIG. 5), and/or in connection with FIG. 6.

In several embodiments, method 400 further optionally can include a block 430 of generating the image embeddings from the image data of the first item. In many embodiments, the image embeddings can be generated using a suitable image embeddings model, such as the VGG16 (Visual Geometry Group (VGG) 16 layer) model. The VGG16 model was described by K. Simonyan and A. Zisserman of the University of Oxford, and is a convolutional neural network model with 16 layers for classification and/or detection of images. In a number of embodiments, the VGG16 model can convert an image into image embeddings in the VGG feature space. In several embodiments, the image data for other items in the item catalog can be similarly pre-processed to generate image embeddings for those items, which can be used in block 440, described below. In many embodiments, block 430 can be similar or identical to the activities described below in blocks 530 and/or 540 (FIG. 5), and/or in connection with FIG. 7.

In a number of embodiments, method 400 also can include block 440 of generating candidate variant items from the item catalog for the first item using a combination of (a) a k-nearest neighbors approach to search for first candidate variant items based on text embeddings for the attribute information of the first item, and (b) an elastic search approach to search for second candidate variant items based on image embeddings for the image data of the first item. In several embodiments, the k-nearest neighbors approach (e.g., machine learning) can be a supervised classification algorithm using labelled data as training data to generate predictions. In many embodiments, block 440 can learn how to classify new, unlabeled data, using k-nearest neighbors, by analyzing the k number of the nearest data points. In several embodiments, k-nearest neighbor algorithm can be used for classification and/or regression of data when an attribute is known, unlike a k-means clustering algorithm that can be used to gather and group data into k number of clusters. In several embodiments, block 440 can be similar or identical to activities described below in connection with block 540 (FIG. 5). In a number of embodiments, block 400 can be a high recall model, which can be aimed at returning most of the relevant results, as opposed to a high precision model (such as implemented in blocks 450-460 described below), which can be aimed at returning more relevant results than irrelevant results. In a number of embodiments, the k-nearest neighbors approach can include using a non-metric space library (NMSLIB). For example, NMSLIB can be used to search for items in the item catalog that are textually similar to the first item. In some embodiments, the k-nearest neighbors approach (e.g., NMSLIB) can be based on comparing the text embeddings associated with the first item and/or the items in the item catalog in the LSTM space. In several embodiments, block 440 can be similar or identical to the activities described below in blocks 540 and/or 545 (FIG. 5).

In several embodiments, the elastic search approach can be used to search for items in the item catalog that have images similar to one or more images of the first item. In some embodiments, the elastic search approach can be based on comparing the image embeddings associated with the first item and/or the items in the item catalog in the VGG feature space.

In a number of embodiments, the combination used to generate the candidate variant items can include a union of the first candidate variant items generated using the k-nearest neighbors approach and the second candidate variant items generated using the elastic search approach. Testing on various product types has indicated that combining the two approaches (e.g., the text-based approach and the image-based approach) can include the recall of items that can be relevant over approaches that use a single one of the two approaches.

In several embodiments, method 400 additionally can include a block 450 of performing respective classifications based on respective pairs comprising the first item and each of the candidate variant items to filter the candidate variant items. In some embodiments, block 450 can be similar or identical to the activities in blocks 540 and/or 545 (FIG. 5). In a number of embodiments, the respective classifications can be performed using a logistic regression model with L1 regularization based on respective product type classification embeddings for the candidate variant items. In a number of embodiments, the logistic regression model can be a shallow classifier. In several embodiments, the logistic regression model can be trained on pairs of items (e.g., pairs of item identifiers). For example, a pair of items can include the first item and another item in the candidate variant items. Given an input pair of items, the logistic regression model can determine whether the pair is a variant, which can be labeled as label 1, or instead not a variant, which can be labeled as label 0. In many embodiments, the logistic regression model can be based embeddings generated for each of the items for the product type classification of the model. The logistic regression model can be a high precision model (as opposed to a high recall model described above in connection with block 440).

In several embodiments, the logistic regression model can be trained on product ids pairs with an L1 regularization technique (e.g., Lasso regression) to adjust the model weights on relevant features, to predict whether the pair is variant (label 1) or not (label 0). In many embodiments, the model beneficially can provide dimensionality reduction and/or weightage on the dimensions that relevant.

Various approaches to providing training data can be used. For example, in a first training data approach, curated data can be unavailable, so training data can be created from existing groups in the catalog. In such training data, not all product types may be well represented. For example, there can be 1316898 positive examples, which are random pairs created within selected groups, and there can be 1012630 Negative examples, which can be 50% with the same product type & brand, 35% within the same product type without the same brand, and 15% from random pairs from different groups. Additional hard negatives can be added through tf-idf (term frequency-inverse document frequency).

In another example, a second training data approach can include two sets of training data created with a combination of filtered training from the first training data approach described above, which can have multiple product types as in the first training data approach, and using tf-idf based hard pairs on various product types. In the first set for the second training data approach, there can be 90% sample training from the first training data approach, and 10% hard pairs, for a total of approximately 300 thousand. In the second set for the second training data approach, there can be 75% sample training from the first training data approach, and 25% hard pairs, for a total of approximately 600 thousand.

In many embodiments, hard pairs can be created by creating hard positive and hard negatives. Hard positives can be pairs that have significantly different titles, but are in fact variants. Hard negatives can be pairs that have very similar titles, but are in fact not variants.

In several embodiments, hard positives can be created from pairs with label 1 within groups if the ti-idf title similarity is lower than a predetermined threshold. This approach can capture true variants that have quite dissimilar titles. In some embodiments, this approach also can drop edge cases (e.g., absolutely dissimilar titles that are grouped together wrongly in the catalog (e.g., over-grouped)) as such cases can be unhelpful to train the model.

In a number of embodiments, hard negatives can be created from pairs with label 0 from different groups if the ti-idf title similarity is above a predetermined threshold. This approach can capture pairs that are not variants but have titles that look very similar and can fall within the same product line. In some embodiments, this approach also can drop the edge cases (e.g., exact titles that are not variants in the catalog (e.g., under-grouped), as they could have incorrect grouping in the catalog), as such cases can be unhelpful to train the model.

In several embodiments, tf-idf based pair creation can be limited to titles that are more than 3 words long for reliability and avoiding titles that do not have meanings and based on alphanumeric naming of merchandise. Edge cases based on tf-idf computation also can be dropped from the first training data approach to improve the quality of the samples taken from it. In many embodiments, a pair with an item from a golden dataset can be dropped to avoid leakage of information into training data.

In a number of embodiments, the golden dataset can be a dataset that is different from the training datasets, which can be used as a benchmark to evaluate the model after training to see how well the model performs, even as the model changes. For example, the golden dataset can include 1095 test groups across 4200 product types. In several example, the golden dataset can be manually created, such that data can been biased to high GMV (gross merchandise volume) items, as there can be a correlation between GMV and the reliability of the data, in some cases.

Evaluation of the first training data approach involved separating 30% of the training set pairs as a hold-out set. The precision was found to be 95.80%, the recall was found to be 97.38%, and the accuracy was found to be 96.95%.

Evaluation of the second training data approach involved pairs of the first training data approach that were selective sampled, and hard pairs based on title similarity of variants and non-variants were added. 30% of the training set pairs were separated as a hold-out set. The precision was found to be 83%, and the recall was found to be 82%.

In a number of embodiments, method 400 further can include block 460 of determining a respective distance between the first item and each of the candidate variant items, as filtered. In many embodiments, the respective distance can be determined using a Siamese network. For example, the Siamese network can include two identical neural networks (e.g., twin neural networks) and one loss function module. The two identical neural networks share the same weight. The output of the Siamese network can be a distance, which can describe a measure of similarity or dissimilarity between the input pair. A large distance can mean the inputs are different, and a small distance can mean the inputs are similar. A threshold can be selected and used in a decision function, such that if the distance is smaller than the threshold, then the input pair can be predicted as variants, otherwise, they can be determined to not be variants. In testing, performance of the Siamese network model can be found to have a precision of 95.80%, a recall of 97.38%, and an accuracy of 96.95%. By combining blocks 450 and 460, the precision can beneficially be improved. Block 460 can be similar to identical to the activities described below in FIG. 6 and/or FIG. 7.

In several embodiments, method 400 additionally can include a block 470 of determining one or more items in the candidate variant items, as filtered, to include in a variant group for the first item, based on a decision function using a predetermined threshold and the respective distance for the each of the candidate variant items, as filtered. In many embodiments, if the distance is below the predetermined threshold, then the candidate variant item can be determined to be including in the variant group with the first item. In many embodiments, multiple candidate variant items can be included in the variant group with the first item. In some embodiments, the variant group can be used as a base variant group on the website provided by web server 320 (FIG. 3). In a number of embodiments, the variant group can be suggested to one or more human reviewers to evaluate the variant group for accuracy.

In some embodiments, when items are found to not be variants of each other, based on the decision function, but those items are included in the same base variant group, such item can be flagged for further review, to potentially be split from being included in the same base variant group.

In some embodiments, determining whether items are variants of each other can be used to detect inconsistencies in product type data for items. For example, there can be five items, in which four of the items have a product type of "Polos" listed in the item catalog, and a fifth item has a product type of "Hats" listed in the item catalog.

If all of these items have been included in a base variant group, the base variant group can be flagged for review as having inconsistent product type data. The techniques described herein can determine that these products all are variants, for example, in which case the label of "Hats" for the product type of for the fifth item can be flagged as inconsistent, to be corrected.

In a number of embodiments, method 400 optionally can include a block 480 of handling multiple variant groups. In some embodiments, block 480 can be similar or identical to the activities described below in block 560 (FIG. 5). In a number of embodiments, multiple variant groups can be generated, similarly to the approach of generating a variant group described above. As an example, item IDs 1, 2, 3, 4, 5, 6, 10, 15, 35 can be different nail polish item identifiers, which can potentially be grouped together. The techniques described above can be used to suggest multiple variant groups, as listed below in Table 1, in which each row is a suggested variant group. Sending all of these groups for manual review can use extra resources in terms of cost and effort to review many groups.

TABLE 1

| Group No. | Group members |
| --- | --- |
| 1 | 1, 2, 3 |
| 2 | 1, 2, 4 |
| 3 | 1, 2, 3, 4 |
| 4 | 3, 4, 5, 6 |
| 5 | 5, 6 |
| 6 | 1, 2 |
| 7 | 10, 5 |
| 8 | 1, 2, 3, 5, 15 |
| 9 | 1, 2, 3, 4 |

In a number of embodiments, block 480 of handling multiple variant groups can include determining a coherence score for the variant group to select one or more supergroups from among multiple variant groups. The multiple variant groups can include the variant group. It can be beneficial to narrow down the number of groups, yet include most of the variants items. For example, in order to prioritize which variant groups to use, higher confidence groups can be selected for manual review to gauge the accuracy of the variant groupings. As there can be multiple groups with partial or complete overlap, superset groups with a high coherence score can be prioritized. If a unique group is a superset of multiple smaller subset groups, then this supergroup has a higher recall for variants, and it can be selected for review. This determination can be based on a coherence score, in which the higher the coherence score, the higher the priority for selecting the variant group, in which coherence score is defined as:

$$\text{Coherence score} = (\#\text{of smaller groups that are contained by the supergroup})/(\text{supergroup size})$$

Based on coherence scores, the supergroups can be selected as shown in Table 2, in which each row is a supergroup.

TABLE 2

| Group No. | Group members | Group Size | Group Frequency | Coherence Score |
| --- | --- | --- | --- | --- |
| 3 | 1, 2, 3, 4 | 4 | 6 | 1.5 |
| 4 | 3, 4, 5, 6 | 4 | 2 | 0.5 |
| 7 | 10, 5 | 2 | 1 | 0.5 |
| 8 | 1, 2, 3, 5, 15 | 5 | 5 | 1.0 |

In some embodiments, groups to be selected from the supergroups can be groups having a coherence score higher than a threshold, such as 0.8., such that groups 3 and 8 can be selected.

In a number of embodiments, block 480 of handling multiple variant groups can include determining a Jaccard similarity score between multiple variant groups. In some cases, the groups selected can have a partial overlap, such as in groups 3 and 8, even though these groups have high coherence scores, but they are not subsets of each other. In a number of embodiments, the Jaccard similarity scores can be determined, as follows:

$$\text{Jaccard Similarity} = (\text{size of the set intersection of the items in the two groups})/(\text{size of the set union of the items in the two groups})$$

The Jaccard similarity score for groups 3 and 8 can be $\frac{3}{6} = 0.5$. In a number of embodiments, a threshold can be used for the Jaccard similarity score to determine whether to merge these two groups together and send for review as a single group, or instead to keep as separate groups. In this case, the threshold can be high enough that the groups are merged, into a single group including items 1, 2, 3, 4, 5, and 15.

In another example, the groups in Table 3 can be selected as supergroups using the coherence scores, in which there are two groups with an overlap of a single item, item 91, which can possibly by a false grouping by the model in the second group.

TABLE 3

| Group No. | Group members |
| --- | --- |
| 1 | 90, 91, 92 |
| 2 | 91, 100, 101, 102, 103, 104, 105, 106 |

The Jaccard similarity score can be determined here as $\frac{1}{10} = 0.1$, which can be a low value, which can indicate to keep the groups separate as independent groups. During manual review, it is possible that item 91 will be dropped from the second group, in which case the groups of items will be as shown in Table 4 after the manual review.

TABLE 4

| Group No. | Group members |
| --- | --- |
| 1 | 90, 91, 92 |
| 2 | 100, 101, 102, 103, 104, 105, 106 |

Turning ahead in the drawings, FIG. 5 illustrates a flow chart for a method 500 of automatically generating variant suggestions based on machine learning models, according to an embodiment. In some embodiments, method 500 also can include a method of identifying variant groups of an item. In various embodiments, method 500 further can include a method of automatically performing divisive hierarchical clustering based on a hierarchy dendrogram to determine respective items belonging to each variant group. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. In many embodiments, method 500 can be implemented by variant group system 310 (FIG. 3).

In various embodiments, method 500 can utilize machine learning models and/or deep learning models that can automatically suggest base variant groupings from one or more sellers of the items. In some embodiments, the base variant groupings can allow users to view each of the item variations of respective items displayed on the same item page, a webpage, and/or another suitable type of electronic media. In several embodiments, method 500 can generate embeddings using a Siamese neural net model ("Siamese net model") for both textual ("text") information and image data of the candidate items. In various embodiments, method 500 can load the Siamese embeddings ("embeddings") from the Siamese net model to a similarity search algorithm to index the Siamese embeddings. In several embodiments, the Siamese embeddings, as indexed, can be used to generate adjacency lists for items. In some embodiments, method 500 can generate connected components (e.g., graphs) from the adjacency lists. In several embodiments, method 500 can partition connected components into various sizes. In various embodiments, connected components that exceed a predetermined size threshold (e.g., large sizes) can use hierarchical clustering to determine an output of a group of variants that are variants of an item.

In some embodiments, method 500 also can use Siamese embeddings representing items (e.g., candidate items) from a catalog to generate sub-clusters and/or clusters using similarity search algorithms via machine learning models. Such similarity algorithms can include nearest neighbors retrieval techniques and/or a k-means clustering algorithm, as described above in connection with block 440 (FIG. 4) and/or described below in connection with block 540. In many embodiments, k-means clustering algorithm can include an unsupervised clustering algorithm using unlabelled data (e.g., clusters) as training data. In some embodiments, method 500 can include learning how to cluster unlabelled points in clusters, using k-means clustering, by analyzing the mean distance of the unlabelled points in the clusters. In several embodiments, method 500 can partition the sub-clusters by hierarchical clustering to generate a final suggested group of variants of each other. In various embodiments, the output of the machine learning models can be reused as data to tune predetermined thresholds, to retrain machine learning models, and/or another suitable use, such as described above in connection with block 310 (FIG. 3).

In several embodiments, method 500 can include a block 510 of obtaining image and attribute information of a candidate item in an item catalog, which can include identifying candidate items within a product type. In some embodiments, block 510 can be similar or identical to the activities described in block 410 (FIG. 4). In various embodiments, identifying the candidate set of items within the product type can include: (i) identifying a product type based on a use case of one or more users and/or (ii) querying the textual attributes and/or image data for the candidate items. In several embodiments, identifying a product type can include selecting product types which are undergrouped (e.g., several items can be ungrouped or several small groups can be merged to a bigger group) or product types which can be over-grouped (e.g., the groups can be more generic and can split into more precise sub-groups).

In many embodiments, training data can include interpretable data representative of future data distribution for an outcome prediction. In some embodiments, the training data can be sampled in statistically significant proportions across different product types so as to have representation across wide range of grouping pattern in different product types. In several embodiments, the sampling strategy can give a higher weightage on items which belong to existing groups in the catalog with higher revenue or engagement with the underlying assumption that high performing item can be more likely to exist in accurate groups and henceforth, suitable for training data preparation. In many embodiments, the data quality of product attributes like product name, description, brand) and images (primary and secondary images) for the items sampled for training data also can be validated by using a combination of machine learning and heuristic-based technique like length checks, removing training examples that have several unwanted terms and bad phrases in their attributes, and few other standard content quality check methods.

In several embodiments, the candidate set of items can be pre-processed as standalone items or variants in a group with a predetermined group score. In some embodiments, a group score can be a metric calculated as: ratio of group size divided by all possible combination of variant attribute value. For example, if a group 10 items of t-shirts varying by 3 color values (red, white and black) and 6 size values (XS, S, M, XL, XLL, XLLL), then group_score for these 10 items would be $10/(3*6)=0.55$. Maximum group score is 1 if all possible combination of variant attributes are available amongst the items e.g., all 18 pairs for the 18 combinations above making a complete group. In following with this example, the group score can indicate the comprehensiveness of the group. For example, an existing group with high group score (>0.8) is considered as high quality group, which can likely to have higher revenue and better user experience. Those groups excluded in the candidate set. In this example, a group with low group score (<0.8) can be considered as an inaccurate group or a group with missing variant items. Those groups can be included in candidate set for model to predict the correct groups.

In many embodiments, method 500 also can include a block 520 of computing Siamese network embeddings for items identified as the candidate set of items, which can include transforming text information and image data into numeric vector representations. In various embodiments, block 520 can be similar or identical to activities described in block 460 (FIG. 4). In some embodiments, block 520 also can generate, using a text Siamese neural network, text embeddings of the attribute information for each candidate item of the set of candidate items within a product type, such as described below in connection with FIG. 6.

In some embodiments, block 520 of computing Siamese network embeddings can include using a pre-trained Siamese network to generate both text embeddings and/or image embeddings of multiple candidate items. In several embodiments, the embeddings can be transformed into predetermined n-dimensional feature embeddings, such as 100-dimensional feature embeddings. In various embodiments, the n-dimensional feature embeddings can be expressed by numeric vector representations of each item of all the candidate items. In some embodiments, the numeric vector representations can be derived from a neural network model to predict whether a pair of candidate items can be a variant of each other or not. In various embodiments, embeddings of the items derived from the neural network model can include similar or identical embeddings for items belonging to a group. In several embodiments, the embeddings can be transformed and stored in a hard disk, and/or another suitable storage media.

In various embodiments, method 500 can include a block 530 of indexing the embeddings for each item using a similarity search algorithm, such as Facebook Artificial Intelligence Similarity search (FAISS) and/or another suitable similarity algorithm. In several embodiments, block 530 further can include indexing the embeddings of the items in an n-dimensional feature space for fast retrieval of nearest neighbors using the similarity algorithm. Such an example can include indexing the embeddings using a 100-dimensional feature space using FAISS.

In various embodiments, Siamese net feature embeddings can be vectors of feature values extracted from a final layer of analysis in a Siamese neural network (e.g., twin neural network). In some embodiments, the vectors of the feature embeddings can be indexed by FAISS for retrieving nearest neighbors. In several embodiments, block 530 also can generate, using an image Siamese neural network, image embeddings of image data for each candidate item of the set of candidate items within or without a product type, such as described below in connection with FIG. 7.

In some embodiments, method 500 can include a block 540 of creating an adjacency list. In many embodiments, block 540 can include identifying each candidate item by a reference identification (ID). In various embodiments, block 540 of creating the adjacency list can include retrieving an "x" number of neighbors until a distance from a reference ID with respect to the farthest xth neighbor equals a predetermined Siamese model cut-off threshold. In some embodiments, the predetermined Siamese model cut-off threshold can be used to determine whether a pair of candidate items are variants of each other. In various embodiments, the output of the pairs of the candidate items that exceed the Siamese model cut-off threshold can be used to create an adjacency list.

In a number of embodiments, retrieving the "x" number of nearest neighbors can be performed in an incremental manner of distance, where x is the N-th neighbor for the reference ID with a maximum allowable distance being equal to a predetermined Siamese network model threshold. Such an example of a threshold can be a distance of 3.5. In various embodiments, block 540 can be similar or identical to the activities described in block 440 (FIG. 4).

In various embodiments, a Siamese network model threshold can include a range within an interval based on a product type, such an interval can be a range of 0-5. In some embodiments, a value of "N" can vary from each reference ID to another reference ID. For example, Table 5 illustrates an exemplary adjacency list using reference IDs for 10 candidate items labelled as A1, A2, A3, A4, A5, A6, A7, A8, A9, A10, and each item "x" includes text embeddings, as indexed. Further, Table 5 illustrates how each of the labelled candidate items for each item x and one or more nearest neighbors can be mapped to the reference ID of item x. In this example, the table illustrates the distance between a last neighbor and a reference ID where each reference ID equals a predetermined Siamese network model threshold, such as a threshold of 3.5.

Table 5 lists each reference ID mapped to a group of nearest neighbors of an anchored reference ID, as indexed, such as by using FAISS. In this example, A1 represents an anchored reference ID for an item x and a group of nearest neighbors equal to a threshold of 3.5, such as can be expressed as: A1→'A1, A2, A3, A4, and A5'.

Table 5 also provides the exemplary adjacency list in a table format, where pairwise distances can be computed for all possible binary predictions and where positive labelled pairs, with a pairwise distance less than or equal to a Siamese model cut-off threshold, are saved as data for a graph of connected components.

TABLE 5

| Adjacency List | | |
|---|---|---|
| A1 | → | 'A1 A2 A3 A4 A5' |
| A2 | → | 'A2 A1 A3 A5 A6' |
| A3 | → | 'A3 A2 A1 A4 A7 A6' |
| A4 | → | 'A4 A3 A1 A5 A6' |
| A5 | → | 'A5 A4 A1 A6 A7 A2' |
| A6 | → | 'A6 A2 A3 A7 A4 A5' |
| A7 | → | 'A7 A3 A5 A6' |
| A8 | → | 'A8 A9 A10' |
| A9 | → | 'A9 A8 A10' |
| A10 | → | 'A10 A8 A9' |

In various embodiments, method 500 can include a block 545 of consolidating image and text embeddings, which can include applying union logic to consolidate one or more adjacency lists. In some embodiments, by combining text and image embeddings, block 545 generates separate adjacency lists for images and texts and iterates candidate items with each item serving as a reference ID. For example: reference ID→nearest neighbors of an anchored reference ID, as indexed (e.g., FAISS). In various embodiments, embeddings and predictions for text can be derived from a Siamese text model, as referenced in block 520 and described below in connection with FIG. 6. In some embodiments, embeddings and predictions for images can be derived from a Siamese image model, as referenced in block 520 and described below in connection with FIG. 7. In various embodiments, in the case of a union of both text embeddings and the image embeddings, each reference ID can be consolidated as the union of nearest neighbors derived from both models.

In several embodiments, calculating the distance for any candidate pair of the union of both the image model and the text model can include normalizing the image model and the text model to the same scale prior to using union logic. In some embodiments, union logic can be expressed by rules based on whether a prediction is a label 1 (a variant) or a label 0 (not a variant), such rules can be expressed as follows:

When a prediction is label 1 (variant):

If both models predict a label 1 (variant) then compute the pair distance as the smaller distance of the two distances: image and text.

If one of the models, image and text, predicts a label of 1: select the smaller of the normalized distances from the two distances from the image model and text model for the pair of items.

When a prediction is a label 0 (not a variant):

If both the image model and the text model predict a label 0 (not a variant): select the larger of the normalized distances. Output can be a consolidated list of pairs which are variants (label 1) and the corresponding pair distances.

In some embodiments, consolidating two sets of adjacency lists (derived from image and text) can be optional. In several embodiments, if the adjacency list is derived from one model, then block 545 directly loads one adjacency list that can be represented as a graph of connected components.

In several embodiments, method 500 can include a block 550 of loading the candidate items in the adjacency list into a graph, which can include assigning sizes to each connected component row in the graph. In many embodiments each node of the graph can be a product identification, where edges between the nodes can include a positive pair connection (edge length can be a pair distance between Siamese embeddings from a text model and/or an image model).

In several embodiments, the adjacency list can be loaded into a graph representation of multiple connected components, where the adjacency list for items in a product type can be derived from N nearest neighbors, where the Nth neighbor is the last neighbor with a maximum allowable neighbor distance equal to a Siamese model cut-off. In several embodiments, loading data for the candidate items in the adjacency list also can include: (i) loading Siamese embeddings into a similarity index algorithm, such as FAISS, (ii) building the index, and (iii) retrieving nearest neighbors to generate connected components.

In various embodiments, block 550 also can include using hierarchical clustering (e.g., divisive hierarchical clustering) to break connected components into subgroups. In several embodiments, the connected components can be further grouped and/or classified into sub-groups and/or groups by using brand filters, K-means cluster, and/or hierarchical clustering. In various embodiments, aggregation further can output a list of lists of items as suggested groups of variants.

In various embodiments, the multiple connected components where the nodes are candidate item identifications (IDs), where each edge connection (e.g., a link) between two nodes can represent a model predicted variant neighbor link, where an edge length can be the pair distance. In several embodiments, block 550 can assign sizes to each connected component, where an output can include a list of disjoint lists (e.g., any item can be present in only one list).

Examples of such a disjoint list using candidate item IDs are as follows:

[A1, A2, A3, A4, A5, A6, A7]

[A8, A9, A10]

In some embodiments, method 500 can include a block 555 of creating a subgroup, using hierarchical clustering, based on the size of each connected component. In several embodiments, determining one or more sizes of a connected component can be based on one or more algorithms corresponding to the one or more types of breakdown logic, such as follows:

a) Check the size of a connected component row, if the size>a connected_component_size_cap, then use a brand filter to derive a same brand of subgroups from connected components of size>connected_component_size_cap and/or outlier connected components. Derive all same brand filtered subgroups from these outlier components.

b.) Check the size of all same brand and/or a normalized brand filtered subgroups, then if a new size>connected_component_size_cap, then use K-means to partition the subgroups further with a K value until all derived partitions are<=connected_component_size_cap.

c.) When all connected components and/or partitioned connected components through a brand and/or a k-means with size<=connected_component_size_cap, then assign a component size to each and separate into 3 categories: SMALL/MEDIUM/LARGE. Each size can be handled differently to derive clusters and/or suggested variant groups.

In several embodiments, when the assigned component size is SMALL (e.g. connected component size=25), then the algorithm can suggest a connected component as a suggested variant group.

In some embodiments, when the assigned component size is MEDIUM (e.g. connected component size=500), and if the clustering coefficient is high (e.g., tightly inter-bounded component) then the algorithm can suggest a connected component as a suggested variant group and/or conduct divisive hierarchical clustering within the component.

In various embodiments, when the assigned component size is LARGE (e.g. connected component size=5000), then the algorithm can conduct divisive hierarchical clustering within the component.

As an example, a connected component list can be used to assign sizes to subgroups as illustrated in Table 6., as expressed below:

TABLE 6

| Subgroups by size | | | |
|---|---|---|---|
| Group members | Group cluster | Cluster origin | Size bucket |
| (a0, a1, a2, a3, a4, a5, a6, a7, a8, a9, a10, a11, a12, a13, a14, a15, a16 . . . , a1121) | 1122 | connected_component | BIG |
| (b0, b1, b2, b3, b4, b5, b6, b7, b8, b9, b10, b11, b12, b13, b14, b15, b16, b17, b18, . . . , b531) | 532 | connected_component | MED |
| (c0, c1, c2, c3, c4, c5, c6, c7, c8, c9, c10, c11, c12 c13, c14, . . . , c209) | 210 | k-means | MED |

TABLE 6-continued

| | Subgroups by size | | |
| --- | --- | --- | --- |
| Group members | Group cluster | Cluster origin | Size bucket |
| (d0, d1, d2, d3, d4, d5, d6, d7, d8, d9, d10, d11, d12, d13, d14) | 15 | k-means | SMALL |
| (e0, e1, e2, e3, e4, e5, e6, e7, e8, e9) | 10 | Brand filter | SMALL |
| (f0, f1, f2, f3, f4, f5) | 6 | k-means | SMALL |
| (g0, g1, g2, g3, g4) | 5 | Brand filter | SMALL |
| (h0, h1, h2, h3) | 4 | connected_component | SMALL |

For example, the connected component list can include rows and columns of data used to assign a size for a group of connected components (or a subgroup) based on algorithms, expressed below as follows:

When an assigned bucket size (e.g., subgroup or group) is LARGE, conduct divisive hierarchical clustering within the component to determine variant groups. When the assigned bucket size is MEDIUM ("MED"), compute the average clustering coefficient of the components. For example, if the clustering coefficient of the components<0.7 (predetermined threshold), then conduct divisive hierarchical clustering or else suggest component to be a variant group.

When the assigned bucket size is SMALL, suggest the component as a variant group.

In various embodiments, a clustering coefficient for one or more nodes on a graph can be the number of triangles (e.g., complete triangles) divided by the number of edges incident (e.g., linked) through the node. For example, two nodes can be connected with each other with edges, where an edge can include a pair of nodes (e.g., a positive variant pair). In some embodiments, the clustering coefficient can be an indicator of compactness of the nodes in a graph. For example, a node with more interconnections (e.g., edges) with respect to other nodes can have a higher value than the other nodes.

In a number of embodiments, an average clustering coefficient can be the average of clustering coefficients of all nodes in a connected component, which can indicate the intra cluster tightness of binding with each another. In some embodiments, a Max value can be achieved when an average clustering coefficient=1. The maximum ("Max") value of 1 can be obtained when all nodes are interconnected with one another. In various embodiments, all nodes with a clustering coefficient=1, can indicate that each node is interconnected and a variant of one another in the cluster.

In several embodiments, an average clustering coefficient used in graph concepts can be based on triplets of nodes, where the clustering coefficient can be a measure of a proportion of triadic closures out of all possible triads. In some embodiments, a triplet can include three connected nodes and a triangle can include three closed triplets, where one triplet can be centered on each of the nodes as anchor node.

In some embodiments, a Max value can be achieved when an average clustering coefficient=1. In various embodiments, all nodes with a clustering coefficient=1, can indicate that each node is interconnected and a variant of one another in the cluster.

In some embodiments, an advantage of computing an average clustering coefficient can include a measure of confidence in the cluster as belonging and/or being part of a suggested variant group. For example, a cluster or group of items with a high average clustering coefficient can include a likelihood (e.g., predicted) that all possible pairs in that cluster can be a variant of one another. As another example, such a likelihood or prediction can be based on using a Siamese network model to predict whether items can be grouped as a variant group.

In several embodiments, a low average clustering coefficient can indicate that some of the item pairs from the cluster are not similar to other items pairs. For example, a Siamese network model can predict that an item pair is not a variant. In such an example, the item pair can still be part of a cluster through another item or linkage without being a variant pair. For example, item pairs, (A and B) and (B and C), can be determined to be variant pairs and can suggest, with a low degree of confidence, that A is linked to C as a cluster and/or as a variant group.

In various embodiments, assessing how compact a set of items can be in a connected component can include using the concepts of (i) triplets of nodes or (ii) triadic closures or (iii) complete triangles of nodes (e.g., closed triangles). For example, let item pair (A, B) be two items and/or nodes predicted as a variant based on an embedding distance for the pair being less than<a predetermined threshold.

In this example, an undirect edge can be drawn between A and B. Similarly, in this example, item pair (B, C) can be another item pair of items and/or nodes predicted as a variant as the embedding distance for the pair is less than < a predetermined threshold, therefore, an undirect edge also can be drawn between B and C.

In following this example, for item pair (A, C), the Siamese network distance is greater than > a predetermined threshold, therefore the A and C cannot be connected through an edge that defines a variant pair. In this example, item pair A and B can be similar as variants, as well as, item pair B and C, however A directly compared to C can be different enough to not be variants. In following the example, linkages through edges (A,B) and (B, C) can include A, B, C as connected or linked like a chain without A, B, C, as a complete closed triangle. Alternatively, in this example, if item pair (A, C) were similar as variants, an edge can be drawn to connect item pair (A,C) interconnecting nodes A, B, C as a closed triangle or a triplet of nodes or a triadic closure. For example, a connected component or a subset of items in the connected component can be deemed more compact, based on a higher proportion of triadic closures, or closed triangles of nodes, or triplets of nodes, with the connecting edges or pairwise linkages (e.g., a set of items belongs to the connected component). In this example, such a metric can establish a measure or a strength of a bond to a given connected component or a cluster of the connected component by using average clustering coefficients, which computes the average value.

In some embodiments, divisive hierarchical clustering can start with all connected components gathered in one cluster, where iterative splitting of each cluster can occur dividing each cluster into smaller clusters until each cluster includes a node and/or final leaves. An example of divisive hierarchical clustering can include splitting data, such as, a, b, c, d, e, f, g, h gradually in a divisive top-down manner at different levels of the hierarchy until the divided clusters can be separated into the roots of the cluster, where each cluster can include one candidate item or node.

In various embodiments, iterative splitting (e.g., iterative divisive branching) can be performed by implementing a hierarchy tree or a dendogram to organize items belonging to the hierarchy, as per levels of item similarity. In some embodiments, iterative splitting can start with items in a cluster. In several embodiments, the items in the cluster can include an iterative split based on a pairwise distance into final leaves of the hierarchy tree or dendogram for each item or node, which is the the reverse of agglomerative-hierarchical-clustering, In various embodiments, the final suggested groups can be the final clusters suggested by the model by cutting the hierarchical tree at any particular cut-off height or percentile in the sorted order of distance, as described in FIG. 8 and FIG. 9.

In various embodiments, divisive hierarchical clustering for a connected component can include implementing a hierarchy tree of relationships and/or distances of all items (e.g., candidate items) in the connected component. In several embodiments, divisive hierarchical clustering can compute and/or fetch pair distances between item embeddings, as generated by the Siamese network model for text, images, and/or union of text and image (using union logic), as described in blocks 520 and 545. In some embodiments, divisive hierarchical clustering can be represented in a hierarchy tree of relationships and/or a dendrogram. An example of a hierarchy tree of relationships can include a representation of nested clusters of a list of items.

In various embodiments, graph can consist of multiple connected components of different sizes and/or counts. In some embodiments, the graph include items associated with items from specific sellers or from a product type. In several embodiments, connected components on the graph contain items (nodes) each share a common edge with one or more respective items (nodes) indicating the items are likely variants of each other.

In several embodiments, partitioning a large candidate set of items (e.g., a product type from a seller) into smaller disjoint sets can be derived from the connected components. In some embodiments, the smaller disjoint sets (e.g., subsets) can be used to implement the hierarchy tree using smaller connected components. In various embodiments, after partitioning a large candidate set of items, where the connected components remain large, implementing brand-based partitioning or by a k-means technique can be used to derive smaller sets from the smaller disjoint sets.

In some embodiments, block 555 also can include creating a distance matrix by fetching a group of pairwise-distance of items within connected component. Table 7 illustrates an exemplary distance matrix configured with pairwise distances between items A, B, C, D, E, and F, as expressed below.

TABLE 7

| Distance Matrix | | | | | | |
|---|---|---|---|---|---|---|
| Dist. | A | B | C | D | E | F |
| A | 0.00 | 0.71 | 5.66 | 3.61 | 4.24 | 3.20 |
| B | 0.71 | 0.00 | 4.95 | 2.92 | 3.54 | 2.50 |
| C | 5.66 | 4.95 | 0.00 | 2.24 | 1.41 | 2.50 |
| D | 3.61 | 2.92 | 2.24 | 0.00 | 1.00 | 0.50 |
| E | 4.24 | 3.54 | 1.41 | 1.00 | 0.00 | 1.12 |
| F | 3.20 | 2.50 | 2.50 | 0.50 | 1.12 | 0.00 |

In several embodiments, block 555 can include using all pairwise distances in the connected component from the distance matrix to implement a hierarchy tree dendrogram ("dendrogram"). In some embodiments, the hierarchy tree dendrogram can include a cut-off value that can be computed using a p_th percentile of density and/or a distribution of linkage distances between all nodes and/or items in the connected component. In various embodiments, the p_th percentile can be an area in which to partition the dendrogram. In several embodiments, the p_th percentile can be configured based on a size of the connected component and passed through a configuration file.

In some embodiments, a p_th value can be inversely proportional to a size of the connected component, or in other words, the larger the size of a connected component, the lower the p-th cut-off value. In several embodiments, block 555 can cut the dendrogram at a more granular and/or root level to get a larger number of partitioned child clusters with smaller sizes. For example, a size of a connected component exceeds a predetermined size to be called a group, such as 6000. Although the connected component can have a high recall and be helpful by not excluding (e.g., losing) items included in a group, a disadvantage can be that the precision is low reducing a positive user experience. In such a case, the p_th value and/or percentile can be selected based on approximately 30 percentiles in order to cut the tree near to a root level of the hierarchy dendrogram tree so that the size of 6000 can be partitioned granularly into multiple child clusters (e.g., 50 partitions) of sizes ranging around 50 to a few hundreds. Alternatively, if a connected component is of a smaller size, the p_th value on the linkage distances can be selected a higher (e.g., closer to the top of the tree), approximately at the 75 percentile wherein the 500 sized connected component can be partitioned near to the top and deriving a lesser number of child clusters (e.g., 15 child clusters) of small to moderate sizes that can range from 20-100. Such an example illustrates avoiding over-partitioning the connected component to avoid losing a higher recall while attempting to gain precision.

In various embodiments, method 500 can include a block 560 of outputting groups of variants related to an item.

Figure 6:
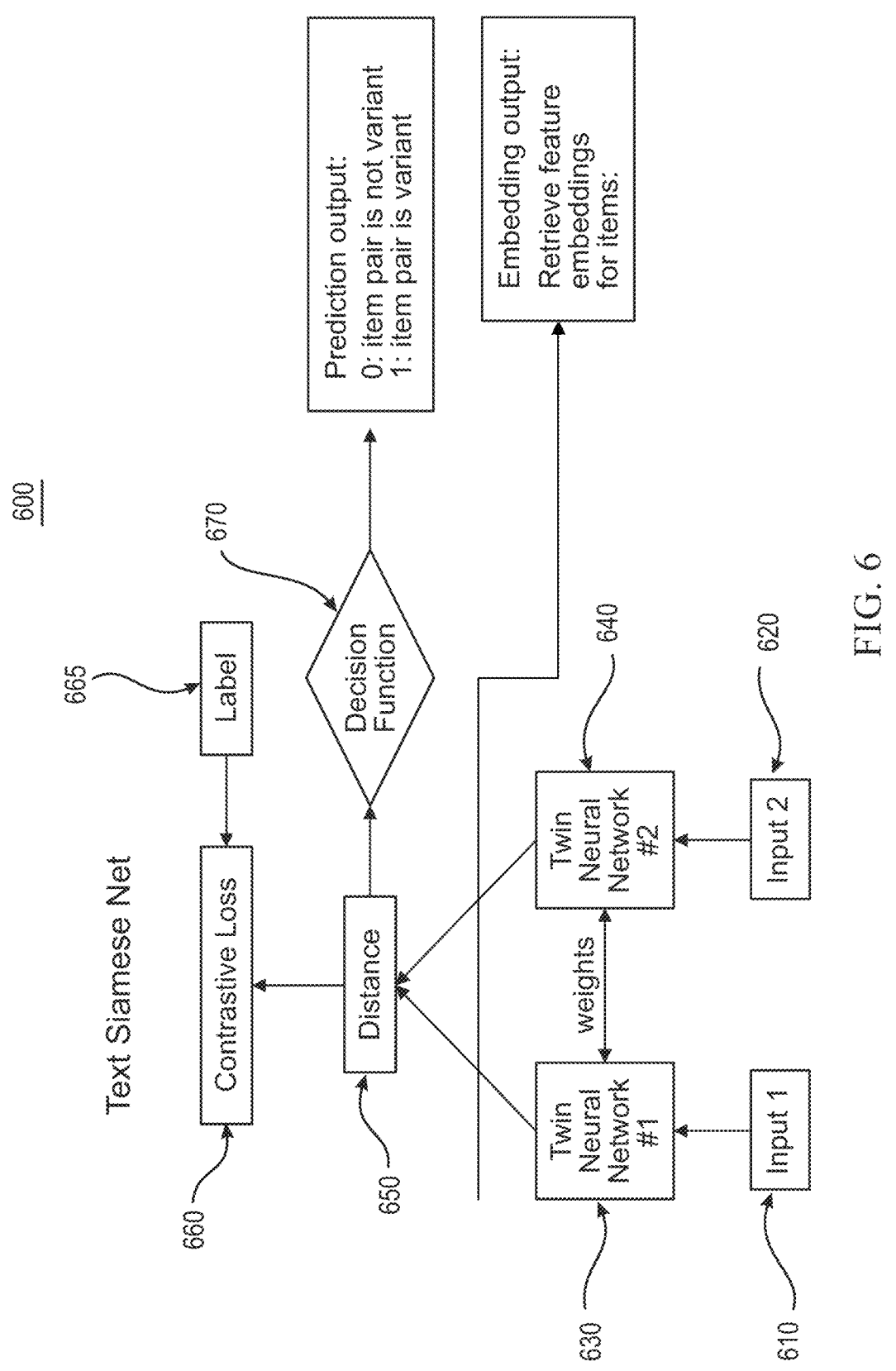
FIG. 6 illustrates a flow chart for a method of using a text Siamese neural network, according to an embodiment.

Turning ahead in the drawings, FIG. 6 illustrates a flow chart for a method 600 of using a text Siamese neural network ("text Siamese net") to determine a respective distance between each of two candidate items, according to an embodiment. In some embodiments, the respective distance can be determined using respective text information of each of the two candidate items. Such text can include product descriptions, product identifications, and/or another suitable text format of an item. Method 600 can be similar or identical to the activities described in block 460 (FIG. 4). Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped. In many embodiments, method 600 can be implemented by variant group system 310 (FIG. 3).

In various embodiments, method 600 can use a text Siamese net including two identical networks (e.g., twin neural networks) and one loss function module. The two identical networks can share the same weight. The text Siamese net can have a pair of inputs and one label representing whether the input pair are the same or from the same class (e.g., product type or category). The output of the text Siamese network can be a distance, which can describe a measure of similarity or dissimilarity between the input pair. A large distance can mean the input pairs are different, and a small distance can mean the inputs are similar. In some embodiments, a distance threshold can be selected to determine the dissimilarity between the input pair. A distance threshold can be selected and used in a decision function, if the distance does not exceed the distance threshold, then the input pair can be predicted to be variants of each other. When distance exceeds the distance threshold, then the input pair can be predicted not to be variants of each other.

In several embodiments, method 600 also can use pre-trained text Siamese net to generate image embeddings for candidate items. In some embodiments, the output from the text Siamese net include can be converted from a text format to an N-dimensional feature embedding, such as a 100-dimensional feature embedding. The text Siamese net contains a dictionary and multiple mathematical functions. The input text can be translated into vectors of digits according to the dictionary, then those vectors can be transformed by the functions into the 100-dimensional size feature embedding. These feature embedding can be encoded vector representations of the items which can be used to compare and compute similarity between items in the context of variant grouping.

In various embodiments, the N-dimensional feature embeddings of the text can be converted into numeric vector representations of each of the candidate items derived from the text Siamese net (e.g., neural network model). In various embodiments, the N-dimensional feature embeddings can be used to predict a distance between the candidate pairs. In some embodiments, a Siamese Neural Network (NN) architecture can include two or more identical mirrored subnetworks. For example, the twin subnetworks both have configurations with the same parameters and same weights.

In several embodiments, text Siamese net can include a dictionary and multiple mathematical functions. In some embodiments, text used as input can be translated into vectors of digits according to the dictionary. In various embodiments, the vectors can be transformed by the mathematical functions into the 100-dimensional size feature embedding. In some embodiments, an advantage of encoding textual data of items as numeric vectors that can include using the numeric vectors to compare with encoding of other items to compute similarity in the context of variant grouping. In various embodiments, the 100 dimension feature embeddings can be the output of the text Siamese net.

In some embodiments, feature embeddings of images of the candidate items derived from the neural network model can be similar or identical for candidate items belonging to a same group. In several embodiments, the feature embedding can be stored in a database, hard disk, or another suitable storage media. In several embodiments, the output of the text Siamese net can include a contrastive loss function and a decision function. In various embodiments, the decision function can include a prediction output to determine whether the pair of items are variants of one another or not. In several embodiments, the prediction output can be a binary number where 0 indicates the item pair is not a variant and 1 indicates the item pair id a variant of one another.

In many embodiments, method 600 can begin with receiving inputs 610 and 620. Each input can include textual information for each of two different candidate items. In some embodiments, method 600 can proceed after receiving inputs 610, 620 to twin neural networks 630 and 640, where both neural networks share the same weight. The twin neural networks 630 and 640 can both be text Siamese nets that can generate feature embeddings of the candidate items. Each of the feature embedding can be converted to numerical vectors of the feature values extracted from the last layer in the twin neural networks. In several embodiments, the feature embeddings can be indexed by FAISS for retrieving nearest neighbors, as described in block 530 (FIG. 5). In many embodiments, method 600 can proceed after two identical neural networks 630 and 640 to determining distance 650.

In some embodiments, method 600 can proceed after determining distance 650 to contrastive loss 660 and label 665 to calculate similarity between the two inputs 610, 620. In several embodiments, method 600 can proceed after distance 650 to decision function 670. In many embodiments, decision function 670 can be used to output a prediction of either 0 where the item pair are not a variants or 1 where the item pair are variants based on the distance between the two inputs, 610, 620.

In various embodiments, training a Siamese net can include using contrastive loss as a loss function. In some embodiments, such a loss function can use the 100 dimension feature embeddings of each of the two inputs with respective labels, which is 0 if the two inputs are from the same base-variant groups and 1, otherwise. In several embodiments, the output can be the distance between embeddings if a label is 0 or the similarity between embeddings if label is 1, where the embeddings are the 100 dimension feature embeddings.

Figure 7:
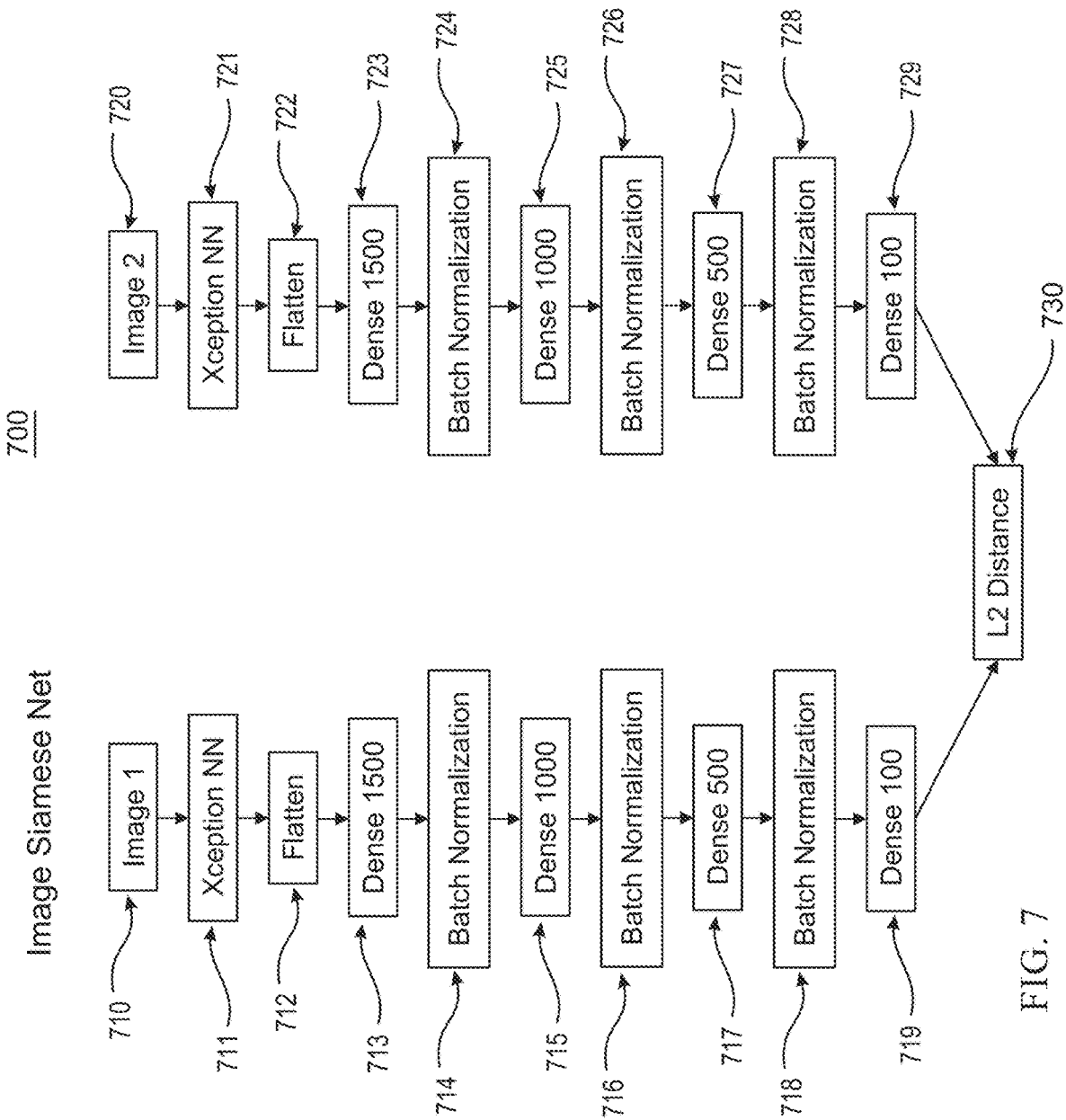
FIG. 7 illustrates a flow chart for a method of an image Siamese neural network, according to an embodiment.

Turning ahead in the drawings, FIG. 7 illustrates a flow chart for a method 700 of using an image Siamese neural network ("image Siamese net") to determine a respective distance between each of two candidate items, according to an embodiment. In many embodiments, the respective distance can be determined using respective image information of each of the two candidate items. Such image can include product images, product identifications, and/or another suitable image format of an item. In some embodiments, method 700 can be similar or identical to various activities described in block 460 (FIG. 4) and method 600 (FIG. 6). Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped. In many embodiments, method 700 can be implemented by variant group system 310 (FIG. 3).

In several embodiments, method 700 can use pre-trained image Siamese net including two identical networks (e.g., twin neural networks) to generate image embeddings for each of the two candidate items. In some embodiments, the output from the image Siamese network can be flattened to an N-dimensional feature embedding, such as a 100-dimensional feature embedding. In various embodiments, the N-dimensional feature embeddings of image can be numeric vector representations of candidate items derived from a neural network model to predict whether the pair of items are variants of one another or not, such as the image Siamese network. In some embodiments, feature embeddings of images of the candidate items derived from the neural network model can be similar or identical for candidate items belonging to a same group. In several embodiments, the feature embedding can be stored in a database, hard disk, or another suitable storage media.

In some embodiments, method 700 can include receiving inputs to an image Siamese net to determine the distance between a block 710 of an image 1 and a block 720 of an image 2 based on the image data. Similar to the activities in method 600, method 700 can include two identical neural networks including a block 711 of a neural network and a block 721 of another neural network, such a neural network can include an Xception Neural Network.

In FIG. 7, the twin sets can include (i) Set 1: Neural network (NN) layers (blocks 711 to 719 (FIG. 7)) and (ii) Set 2: NN layers (blocks 721 to 729 (FIG. 7)).

In several embodiments, each of block 711 and block 721 can output N-dimensional feature embeddings of each image (blocks 710 and 720) that can be numeric vector representations of candidate items derived from the twin neural networks of blocks 711, 721. In some embodiments, such embedded feature embeddings can be receive inputs by blocks 710 and 720, and the image Siamese net can proceed to reduce the vectors of feature embeddings to a predetermined N-dimension in an iterative process as illustrated in connection with FIG. 7.

In many embodiments, the iterative process can involve 712-729, and ending with the L2 distance, expressed as follows:

Blocks 711 & 721 Xception NN: Convert text using a convolutional neural network, such as Xception NN that is 71 layers deep. In many embodiments, a pretrained version of the convolutional NN network can be used to convert the text data into a multi-dimensional array of numeric values.

Blocks 712 &722 Flatten: Convert the data into a 1-dimensional array for inputting the data to the next layer. In some embodiments, flattening the output of the convolutional layers can create a single long feature vector.

Blocks 713 & 723 Dense 1500: Dense layer 1500 refers to the regular deeply connected neural network layer. In various embodiments, a dense layer 1500 can be one of the parameters which is the number of neurons/units in this layer. In some embodiments, the dense layer 1500 can receive the input and return the output.

Blocks 714 and 724 Batch normalization: Batch normalization is a technique for training very deep neural networks that can be used to standardize the inputs to a layer for each mini-batch. In several embodiments, batch normalization can assist in stabilizing a learning process in the NN and reduce a number of training epochs used to train deep networks.

Blocks 715 and 725 Dense 1000: Dense 1000 can be another dense layer with 1000 neurons.

Blocks 716 and 725 Batch normalization: Batch normalization can be an iteration of an iterative process similar to blocks 714 and 724.

Blocks 717 and 727 Dense 500: Similar to Blocks 713, 715, 723, and 725, blocks 717 and 727 can be another dense layer with 500 neurons.

Blocks 718 and 728 Batch normalization: Batch normalization can be another iteration of an iterative process similar to blocks 714, 716, 724, and 725.

Blocks 719 and 729 Dense 100: Similar to Blocks 713, 715, 717, 723, 725, and 727, blocks 717 and 727 can be another dense layer with 100 neurons.

Block 730: L2 distance: In various embodiments, the similarity between the pair can be computed as a euclidean distance or a L2 norm distance between the feature vector 100 dimensional outputs.

Figures 8, 9:
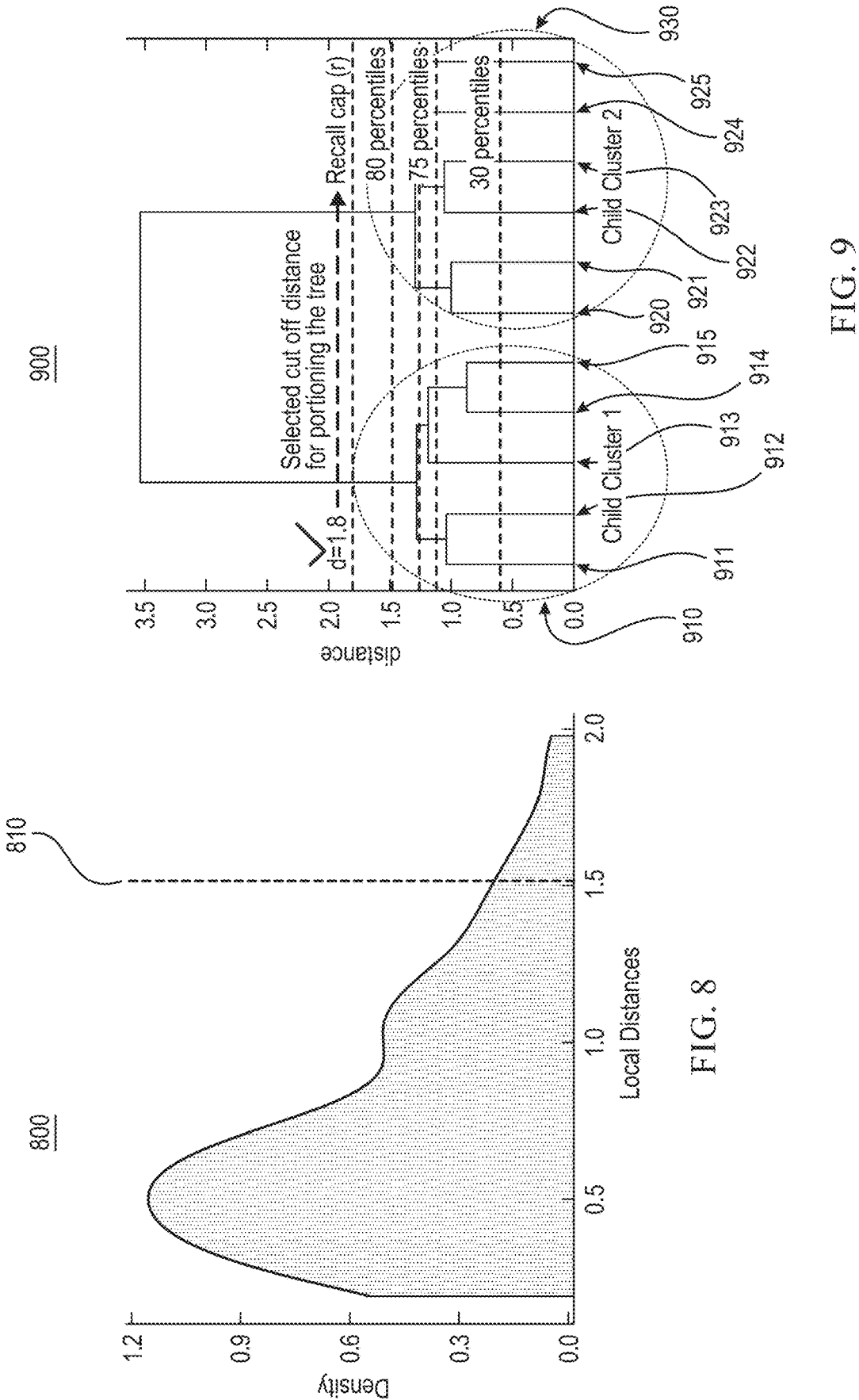
FIG. 8 illustrates an exemplary histogram.
FIG. 9 illustrates an exemplary dendrogram.

Jumping ahead in the drawings, FIG. 9 illustrates a dendrogram 900, according to an embodiment. In some embodiments, dendrogram 900 can be partitioned to show different potential levels (as shown by the 4 dashed horizontal lines) of cutting through and/or partitioning this hierarchy tree to derive different numbers of child clusters in hierarchical clustering. In some embodiments, as the dashed horizontal lines increase in distance (as shown on the y-axis, the number of child clusters reduces, and an average size of the child clusters increases. The x-axis represents the nodes (e.g., candidate items) in the connected component.

In an example, a cut-off distance for partitioning the tree can based on a linkage distance of d=1.8 with a recall cap (r). The linkage distance can be greater than 80 percentiles thereby partitioning dendrogram 900 into two child clusters, 910 and 930, in which each candidate item in each child cluster can be labelled as variants of each other. Child cluster 910 includes candidate items 911, 912, 913, 914, and 915, each of which can be labelled as variants of each other. Child cluster 930 includes candidate items 920, 921, 922, 923, 924, and 925, each of which can be labelled as variants of each other. In various embodiments, the candidate items in child cluster 910 are not labelled as variants of the candidate items in child cluster 930, and vice versa, based on the distance cut-off in dendrogram 900 in this example.

In various embodiments, observations in testing larger (e.g., massive) sized connected components, due to the nature of the groups and items in product types, can illustrate the connected components of over 90% of the linkage distances that can be below a Siamese network threshold distance (e.g., 3.5) to label and/or call a pair of candidate items to be variants of each other even though the size of the connected component can be considered to be a large size.

In such cases, a percentile value of <90 can generate a cut-off distance of 0.5 or lesser (considered a small cut-off distance). In some embodiments, partitioning the hierarchy tree dendrogram (e.g., 900) at a granular distance and/or level can reduce a level of recall when the Siamese network model identifies a candidate item pair to be variants if the candidate item pair embedding distance is less than a predetermined Siamese network threshold distance. In several embodiments, examples can be based on instances of aggressively partitioning the tree, where the partitioning is not considered an optimal balance of recall vs precision. In various embodiments, in such a case, generating an optimal balance of recall versus precision can include defining a middle ground and applying a lower cap and/or a recall cap of an N-value, such as an N-value of approximately 1.8. In such a case, if computed percentile distance is less than the recall cap, then the distance cut-off threshold can be a max (recall_cap, percentile distance).

An example of calculating the max (recall_cap, percentile distance) can be illustrated as follows:

Siamese network threshold distance=3.5
recall cap=1.8
percentile value=80%
computed cut off distance corresponding to percentile=1.5
selected cut off distance=max (recall_cap, percentile distance)=max (1.8, 1.5)=1.8

In following with the example, the tree can be partitioned at a linkage distance and/or height of 1.8, instead of 1.5 to cap on a minimum recall while trading off a reasonable amount overly high precision rate. This example of distance in a histogram (e.g., a density plot) can be shown in FIG. 8, which shows an exemplary histogram, in which 810 illustrates the linkage distance of 1.8 on the histogram graph.

In some embodiments, an advantage of implementing hierarchical clustering over conventional methods of determining variants among candidate items can be shown in the (i) ease of interpretability of dendrogram 900 and (ii) ease of implementation. For example, the output of dendrogram 900 using the dendrogram approach can be used to understand an overall picture of the similarities or non-similarities of candidate items as well as in nested groups and taxonomy within the data for each candidate item. In following with the example, hierarchical clustering can be conducted without providing a pre-determined k-value for the number of children clusters yet can offer a flexible solution to automatically derive the number of clusters based on heuristics like groups, sizes, and densities of a pairwise distance distribution. In such a case, hierarchical clustering can output different perspectives of partitioning levels depending on a level-of-resolution and/or a level of a precision-recall trade-off.

Figure 10:
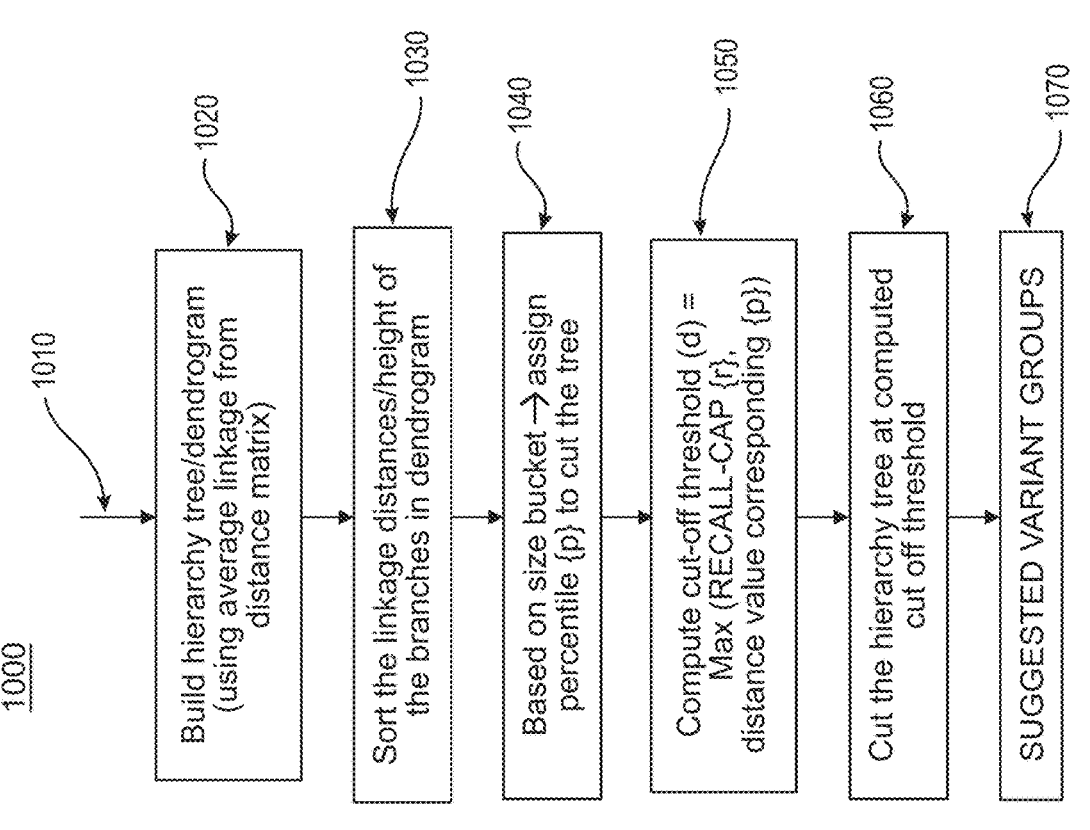
FIG. 10 illustrates a flow chart for a method of partitioning a dendrogram, according to an embodiment.

Turning ahead in the drawings, FIG. 10 illustrates a flow chart for a method 1000 of determining a cut-off distance to partition the dendrogram, according to an embodiment. Method 1000 also can be used to derive child clusters after implementing a top-down hierarchy dendrogram for connected components. Method 1000 is merely exemplary and is not limited to the embodiments presented herein. Method 1000 can be employed in many different embodiments or examples not specifically depicted or described herein. In some embodiments, the procedures, the processes, and/or the activities of method 1000 can be performed in the order presented. In other embodiments, the procedures, the processes, and/or the activities of method 1000 can be performed in any suitable order. In still other embodiments, one or more of the procedures, the processes, and/or the activities of method 1000 can be combined or skipped. In many embodiments, method 1000 can be implemented by variant group system 310 (FIG. 3).

In various embodiments, method 1000 can begin 1010 with receiving data from a distance matrix. Method 1000 can then proceed to building a hierarchy tree 1020 (e.g., dendrogram). The dendrogram can be similar or identical to dendrogram 900 (FIG. 9) In some embodiments, building the hierarchy tree 1020 can be performed by using the average linkage from the distance matrix as input. In several embodiments, method 1000 can proceed after building the hierarchy tree 1020 to sorting linkage distances 1030 (e.g., heights of the branches or levels of the hierarchy tree). In various embodiments, sorting the linkage distances 1030 can use hierarchical clustering. In several embodiments, method 1000 can proceed after sorting the linkage distances 1030 to assigning percentile 1040. In many embodiments, assigning a percentile {p} (e.g., p_th cut off value) to cut the hierarchy tree can be based on a size bucket (e.g., size of the connected components), as described in block 550 (FIG. 5).

In several embodiments, method 1000 can proceed after assigning percentile 1040 to computing a cut-off threshold 1050. In various embodiments, computing the cut-off threshold (d) can be expressed as follows: (d)=Max (recall_cap {r}, distance value corresponding to {p}). In some embodiments, method 1000 can proceed after computing the cut-off threshold 1050 to cutting the hierarchy tree 1060. In many embodiments, cutting the hierarchy tree 1060 can be conducted at the computed cut-off threshold. In several embodiments, method 1000 can proceed after cutting the tree 1060 to outputting suggested variant groups 1070. In some embodiments, the suggested variant groups can be determined below the cut-off threshold including child clusters and candidate items labeled as variants of each other, as described in block 555 (FIG. 5).

In some embodiments, evaluating a stratified sample of suggested groups to crowd review team can be implemented for manually creating true groups to serve as ground truth for evaluation. In several embodiments, after evaluating the stratified sample, method 1000 can compute cluster precision-recall on the reviewed groups to assess whether the quality of suggested variant groups is within a predetermined range of precision-recall to update the retail catalog or website.

In various embodiments, crowd sample generation can include selecting a number of representative groups, such as 50 representative groups. In some embodiments, the selected number of representative groups can be representative of group size and revenue. In many embodiments, the selected number of groups represent groups other than top grouping variant suggestions. In some embodiments, the selected number of groups can be over-grouped to ensure a high recall and avoid false negatives.

In some embodiments, method 1000 can include a stratify sampling strategy based on group size and revenue (GMV). In many embodiments, the group size can include a strategy based on various categories. For example, a list of categories can include small groups, large groups, extreme groups. Small groups can be classified as [0, median group size for the product type, large groups can be classified as [100, median group size for the product type), and extreme groups can be classified as [100, +inf]. A group size threshold of 100 can be replaced by 95% quantile of groups size for the product type or a mean+2*sigma. As an example, strategy can include 25 groups from small groups, 25 groups from large groups; 2 groups from extreme groups, if the group sizes exists. In many embodiments, the term +inf refers to infinity technically, +inf also represents any large value of GMV/revenue which is beyond mean or beyond 97% of the revenue datapoints. In various embodiments, the term mean+2*sigma implies 2 standard deviation distance from the mean value of the data distribution. For example, a normal distribution, 2*sigma above or below the mean can define the interval that includes 95% of the datapoints.

In various embodiments, the stratify sampling strategy can be conducted after the model suggested variant groups are ready. In some embodiments, a goal of the stratify sampling strategy can be to send some sample model suggested groups for a performance review to understand how model predictions are performing and whether the model predictions can be improved in certain categories. For example, stratified sampling can include selecting large and small sized groups from both a high and a low GMV (revenue) groups in order to get a more representative sample and analyze possible inherent bias in grouping prediction based on revenue performance of existing items.

In various embodiments, a revenue (GMV) also can be based on categories and a strategy. For example, categories can include High GMV groups such as, the median GMV in the group\in [median GMV, +inf] and Low GMV groups, such as, the median GMV in the group\in [0, median GMV for the PT).

In some embodiments, within each group size category, the strategy can include 15 groups from High GMV groups and 10 groups from low GMV groups, such as illustrated in Table 8, below. If any extremely large group exists, method 1000 can randomly select at most 2 groups and add them to this sample as well.

TABLE 8

| Stratify Sampling Strategy | | |
| --- | --- | --- |
| | Small Groups | Big Groups |
| Low GMV Groups | 10 | 10 |
| High GMV Groups | 15 | 15 |

For example, the sample evaluation can include crowd reviews of the sample groups and can provide a granular and/or high precision groups from the sample groups along with distinguishing attribute related feedback. The suggested crowd sample can be evaluated with respect to reviewed groups and compute cluster precision and recall.

In various embodiments, an ISAM output file delivery can include precision, recall, and F1-scores. For example, if the precision, recall, and F1-scores are acceptable, a suggested group can be generated with a selected percentile mapping as per processed connected component sizes where the groups can be updated using ISAM platform. In this example, if the evaluation metrics are not acceptable, a different set of mapping can be used for size to percentile cut-off for the dendrogram and regenerate results until a particular precision-recall can be achieved.

In several embodiments, an advantage of generating true clusters can be illustrated based on performance production testing where an A/B testing demonstrated significant revenue lift and an increased conversion for the grouped items updated in a retail catalog by using the machine learning models. For example, the output of the machine learning models showed an improvement in accuracy by 42% relative to pre-existing status as suggested by previous operational feedback. In following with this example, a total market place (MP) seller items grouped was improved by 28% from before a pilot study to the present, with an impact from both machine learning (ML)+seller training/education. In following with this example, MP can imply items sold by third party vendors (sellers). It can include seller training/education to understand foundational relationships of items in variant groups and their variant attributes. In following with this example, ML training can include an iterative process conducted after a period of time (e.g, a gap) to adapt the machine learning model to additional training data, including examples, crowd review feedbacks from of sample groups, seller training/education (training sellers or correctly creating variants groups or adding new items to existing ones), and/or another suitable type of training data.

Turning ahead in the drawings, FIG. 11 illustrates a flow chart for a method 1200 of automatically generating variant groups from a scalable pipeline using machine learning-based base-variant grouping, according to an embodiment. Method 1200 is merely exemplary and is not limited to the embodiments presented herein. Method 1200 can be employed in many different embodiments and/or examples not specifically depicted or described herein. In some embodiments, the procedures, the processes, and/or the activities of method 1200 can be performed in the order presented. In other embodiments, the procedures, the processes, and/or the activities of method 1200 can be performed in any suitable order. In still other embodiments, one or more of the procedures, the processes, and/or the activities of method 1200 can be combined or skipped. In several embodiments, system 300 (FIG. 3) can be suitable to perform method 1200 and/or one or more of the activities of method 1200.

In these or other embodiments, one or more of the activities of method 1200 can be implemented as one or more computing instructions configured to run at one or more processors and configured to be stored at one or more non-transitory computer-readable media. Such non-transitory computer-readable media can be part of a computer system, such as variant group system 310 and/or web server 320. The processor(s) can be similar or identical to the processor(s) described above with respect to computer system 100 (FIG. 1).

In various embodiments, method 1200 can use divisive hierarchical clustering to perform the associated activity, such as creating a hierarchy dendrogram, to determine respective items belonging to each variant group. This divisive hierarchical clustering also can reduce the impact on the network and system resources to reduce congestion in bottlenecks while still allowing data to be accessible from a central location, similar or identical to the activities described in method 400 (FIG. 4) using a distributed network. In some embodiments, method 1200 optionally can include one or more pre-processing activities, such as blocks 1210 and 1215, described below. In some embodiments, method 1200 optionally can include one or more pre-processing activities, such as blocks 1210 and 1215, described below.

Referring to FIG. 11, method 1200 optionally can include a block 1210 of generating text embeddings of the candidate items, using a first pre-trained Siamese neural network. Block 1210 can be similar or identical to the activities described in blocks 510 and 520 (FIG. 5). In some embodiments, the item embeddings of the candidate items can include text embeddings, such as described above in connection with block 520 (FIG. 5) and FIG. 6.

In some embodiments, method 1200 optionally can include a block 1215 of generating image embeddings of the candidate items, using a second pre-trained Siamese neural network. Block 1215 can be similar or identical to the activities described below in block 520 (FIG. 5) and FIG. 7. In many embodiments, the item embeddings of the candidate items include image embeddings, such as described below in connection with block 520 (FIG. 5) and FIG. 7. In several embodiments, block 1215 also can include indexing, using a similarity search algorithm, each of the item embeddings in a feature space for retrieval of nearest neighbors optionally, such as described above in connection with block 530 (FIG. 5). In various embodiments, the similarity search algorithm can be Facebook Artificial Intelligence Similarity search (FAISS), such as described above in connection with block 530 (FIG. 5).

Continuing with FIG. 11, method 1200 can include a block 1220 of creating an adjacency list for candidate items using a distance threshold. Block 1220 can be similar or identical to the activities described in block 540 (FIG. 5). In various embodiments, for each of the candidate items, block 1220 can include determining respective nearest neighbors of the each of the candidate items based on a respective pre-trained Siamese neural network model threshold generated for the each of the candidate items, such as described above in connection with block 540 (FIG. 5). In some embodiments, the distance threshold can be determined using a union logic for the pairs of the candidate items, such as described above in connection with block 545 (FIG. 5).

In a number of embodiments, method 1200 additionally can include a block 1225 of generating graphs of the candidate items in the adjacency list. Block 1225 can be similar or identical to the activities described in block 550 (FIG. 5). In various embodiments, nodes of the graphs can represent the candidate items, such as described above in connection with block 550 (FIG. 5). In some embodiments, edges of the graphs can represent respective predicted variant neighbor links between pairs of the candidate items, such as described above in connection with block 550 (FIG. 5).

In some embodiments, method 1200 further can include a block 1230 of determining, using breakdown logic, first graphs of the graphs that exceed a predetermined size. Block 1230 can be similar or identical to the activities described in block 550 (FIG. 5). In several embodiments, the predetermined size is approximately 5000.

In a number of embodiments, method 1200 also can include a block 1235 of performing divisive hierarchical clustering on each of the first graphs. Block 1235 can be similar or identical to the activities described in block 555 (FIG. 5).

In some embodiments, block 1235 can include a block 1240 of building a respective hierarchy dendrogram of nested subclusters of the each of the first graphs using respective linkage distances between item embeddings of the candidate items of the pairs of the candidate items of the first graphs. Block 1240 can be similar or identical to the activities described in block 555 (FIG. 5), and/or FIG. 10. In various embodiments, block 1240 also can include sorting the respective linkage distances for the each of the first graphs, such as described in connection with block 555 (FIG. 5), FIG. 9, and/or FIG. 10.

Referring to FIG. 11, block 1235 also can include a block 1245 of determining a respective cut-off value based on a respective p-th percentile of density of the respective linkage distances for the each of the first graphs. Block 1245 can be similar or identical to the activities described in block 555 (FIG. 5), FIG. 9, and/or FIG. 10. In several embodiments, the respective cut-off value can be inversely proportional to a respective size of the each of the first graphs, such as described above in connection with block 555 (FIG. 5), FIG. 9, and/or FIG. 10.

Continuing with FIG. 11, method 1200 also can include a block 1250 of identifying recommended variant groups of the candidate item in the nested subclusters of the hierarchy dendrogram below the respective cut-off value. Block 1250 can be similar or identical to the activities described in block 555 (FIG. 5), and/or FIG. 10.

Returning to FIG. 3, in several embodiments, communication system 311 can at least partially perform block 410 (FIG. 4) of obtaining image data and attribute information of a first item in an item catalog; and/or block 510 of obtaining image and attribute information of a candidate item in an item catalog.

In several embodiments, candidate recall system 312 can at least partially perform block 420 (FIG. 4) of generating text embeddings from the attribute information of the first item; block 430 (FIG. 4) of generating the image embeddings from the image data of the first item; block 440 (FIG. 4) of generating candidate variant items from the item catalog for the first item using a combination of (a) a k-nearest neighbors approach to search for first candidate variant items based on text embeddings for the attribute information of the first item, and (b) an elastic search approach to search for second candidate variant items based on image embeddings for the image data of the first item; block 520 of computing Siamese network embeddings for all items identified as the candidate set of items; block 530 of indexing the embeddings for each item using a similarity search algorithm; block 540 of creating an adjacency list; and/or block 545 of consolidating image and text embeddings, which can include applying union logic to consolidate one or more adjacency lists.

In a number of embodiments, precision system 313 can at least partially perform block 450 (FIG. 4) of performing respective classifications based on respective pairs comprising the first item and each of the candidate variant items to filter the candidate variant items; block 460 (FIG. 4) of determining a respective distance between the first item and each of the candidate variant items, as filtered; and/or block 550 of loading the candidate items in the adjacency list into a graph.

In several embodiments, grouping system 314 can at least partially perform block 470 (FIG. 4) of determining one or more items in the candidate variant items, as filtered, to include in a variant group for the first item, based on a decision function using a predetermined threshold and the respective distance for the each of the candidate variant items, as filtered; block 480 (FIG. 4) of handling multiple variant groups; block 555 (FIG. 5) of creating a subgroup, using hierarchical clustering, based on the size of each connected component; block 560 (FIG. 5) of block 560 can include outputting groups of variants related to an item, blocks 610 and 620 (FIG. 6) of receiving inputs; blocks 630 and 640 (FIG. 6) of two identical neural networks generating feature embeddings of the candidate items via text Siamese net; block 650 (FIG. 6) of determining a distance between blocks 630 and 640, block 660 (contrastive loss) (FIG. 6) and block 665 (label) (FIG. 6) of calculating similarity between inputs blocks 610 and 620; block 670 (FIG. 6) of outputting a prediction of either 0 or 1; blocks 710 (image 1) and 720 (image 2) (FIG. 7) of receiving inputs to determine a distance between blocks 710 and 720; blocks 711 (a neural network) and 721 (another neural network) (FIG. 7) of outputting N-dimensional feature embeddings for each image; blocks 712-729 (iterative processes) (FIG. 7) and block 730 (L2 distance) (FIG. 7) of the image Siamese net reducing the vectors of the feature embedding to a predetermined N-dimension in a iterative process; block 1010 (FIG. 10) receiving data from a distance matrix; block 1020 (FIG. 10) of building a hierarchy tree; block 1030 (FIG. 10) of sorting linkage distances; block 1040 (FIG. 10) of assigning percentiles to cut the hierarchy tree; block 1050 (FIG. 10) of computing a cut-off threshold (d); block 1060 (FIG. 10) of cutting the hierarchy tree; and/or block 1070 (FIG. 10) of outputting suggested variant groups.

In various embodiments, database system 316 can at least partially perform block 510 of obtaining image and attribute information of a candidate item in an item catalog.

In some embodiments, web server 320 can at least partially perform sending instructions to user computers (e.g., 350-351 (FIG. 3)) based on information received from communication system 311.

In many embodiments, the techniques described herein can provide a practical application and several technological improvements. In some embodiments, the techniques described herein can provide for automatically determining items to include in a variant grouping. In several embodiments, the techniques described herein further can provide for automatically determining a scalable pipeline using machine learning based base-variant grouping. In a number of embodiments, the techniques described herein can provide a scalable pipelines for machine learning-based base-variant grouping. These techniques described herein can provide a significant improvement over conventional approaches of using human curation for determining base variant groups. In a number of embodiments, the techniques described herein can detect inaccurate data (e.g., incorrect product type of an item in a base variant group), and in some embodiments can suggest a corrected value.

In many embodiments, the techniques described herein can be used continuously at a scale that cannot be handled using manual techniques. For example, the number of unique items can be over 200 million, and there can be hundreds or thousands of updates to items that are received daily.

In a number of embodiments, the techniques described herein can solve a technical problem that arises only within the realm of computer networks, as online ordering with variant groups do not exist outside the realm of computer networks. Moreover, the techniques described herein can solve a technical problem that cannot be solved outside the context of computer networks. Specifically, the techniques described herein cannot be used outside the context of computer networks, in view of a lack of data, and the machine learning models cannot be performed outside the context of computers.

Various embodiments can include a system including one or more processors and one or more non-transitory computer-readable media storing computing instructions configured to run on the one or more processors and perform certain acts. The acts can include obtaining image data and attribute information of a first item in an item catalog. The acts also can include generating candidate variant items from the item catalog for the first item using a combination of (a) a k-nearest neighbors approach to search for first candidate variant items based on text embeddings for the attribute information of the first item, and (b) an elastic search approach to search for second candidate variant items based on image embeddings for the image data of the first item. The acts additionally can include performing respective classifications based on respective pairs comprising the first item and each of the candidate variant items to filter the candidate variant items. The acts further can include determining a respective distance between the first item and each of the candidate variant items, as filtered. The acts additionally can include determining one or more items in the candidate variant items, as filtered, to include in a variant group for the first item, based on a decision function using a predetermined threshold and the respective distance for the each of the candidate variant items, as filtered.

A number of embodiments can include a method being implemented via execution of computing instructions configured to run at one or more processors and stored at one or more non-transitory computer-readable media. The method can include obtaining image data and attribute information of a first item in an item catalog. The method also can include generating candidate variant items from the item catalog for the first item using a combination of (a) a k-nearest neighbors approach to search for first candidate variant items based on text embeddings for the attribute information of the first item, and (b) an elastic search approach to search for second candidate variant items based on image embeddings for the image data of the first item. The method additionally can include performing respective classifications based on respective pairs comprising the first item and each of the candidate variant items to filter the candidate variant items. The method further can include determining a respective distance between the first item and each of the candidate variant items, as filtered. The method additionally can include determining one or more items in the candidate variant items, as filtered, to include in a variant group for the first item, based on a decision function using a predetermined threshold and the respective distance for the each of the candidate variant items, as filtered.

Various embodiments include a system that can include one or more processors and one or more non-transitory computer-readable media storing computing instructions configured to run on the one or more processors and perform certain acts. The acts can include creating an adjacency list for candidate items using a distance threshold. The acts also can include generating graphs of the candidate items in the adjacency list. The nodes of the graphs can represent the candidate items. The edges of the graphs can represent respective predicted variant neighbor links between pairs of the candidate items. The acts further can include determining, using breakdown logic, first graphs of the graphs that exceed a predetermined size. The acts additionally can include performing divisive hierarchical clustering on each of the first graphs. Performing divisive hierarchical clustering can include building a respective hierarchy dendrogram of nested subclusters of the each of the first graphs using respective linkage distances between item embeddings of the candidate items of the pairs of the candidate items of the first graphs. Performing divisive hierarchical clustering further can include determining a respective cut-off value based on a respective p-th percentile of density of the respective linkage distances for the each of the first graphs. The acts also can include identifying recommended variant groups of the candidate item in the nested subclusters of the hierarchy dendrogram below the respective cut-off value.

A number of embodiments can include a method being implemented via execution of computing instructions configured to run on one or more processors and stored at one or more non-transitory computer-readable media. The method can include creating an adjacency list for candidate items using a distance threshold. The acts also can include generating graphs of the candidate items in the adjacency list. The nodes of the graphs can represent the candidate items. The edges of the graphs can represent respective predicted variant neighbor links between pairs of the candidate items. The method further can include determining, using breakdown logic, first graphs of the graphs that exceed a predetermined size. The method additionally can include performing divisive hierarchical clustering on each of the first graphs. Performing divisive hierarchical clustering can include building a respective hierarchy dendrogram of nested subclusters of the each of the first graphs using respective linkage distances between item embeddings of the candidate items of the pairs of the candidate items of the first graphs. Performing divisive hierarchical clustering further can include determining a respective cut-off value based on a respective p-th percentile of density of the respective linkage distances for the each of the first graphs. The method also can include identifying recommended variant groups of the candidate item in the nested subclusters of the hierarchy dendrogram below the respective cut-off value.

In one embodiment, a system comprises one or more processors and non-transitory computer-readable media storing computing instructions that, when executed, perform operations comprising: generating an adjacency list for candidate items using a distance threshold with the maximum allowable neighbor distance equal to a Siamese model cut-off. The operations can also comprise loading data for the candidate items in the adjacency list, and generating graphs of the candidate items in the adjacency list. The operations further can comprise determining, using breakdown logic, first graphs of the graphs that exceed a predetermined size, and building hierarchy dendrograms of nested subclusters of the first graphs. The operations additional can comprise determining cut-off values based on p-th percentiles of density for the first graphs, and identifying recommended variant groups of the candidate item in the nested subclusters of the hierarchy dendrograms below the cut-off values.

In another embodiment, a method can be implemented via execution of computing instructions configured to run at one or more processors and configured to be stored at non-transitory computer-readable media. The method can comprise generating an adjacency list for candidate items using a distance threshold with the maximum allowable neighbor distance equal to a Siamese model cut-off. The operations can also comprise loading data for the candidate items in the adjacency list, and generating graphs of the candidate items in the adjacency list. The operations further can comprise determining, using breakdown logic, first graphs of the graphs that exceed a predetermined size, and building hierarchy dendrograms of nested subclusters of the first graphs. The operations additional can comprise determining cut-off values based on p-th percentiles of density for the first graphs, and identifying recommended variant groups of the candidate item in the nested subclusters of the hierarchy dendrograms below the cut-off values.

In one embodiment, a non-transitory computer-readable medium can store instructions, wherein the instructions, upon execution by a processor, cause the processor to perform operations. The operations can comprise: generating an adjacency list for candidate items using a distance threshold with the maximum allowable neighbor distance equal to a Siamese model cut-off. The operations can also comprise loading data for the candidate items in the adjacency list, and generating graphs of the candidate items in the adjacency list. The operations further can comprise determining, using breakdown logic, first graphs of the graphs that exceed a predetermined size, and building hierarchy dendrograms of nested subclusters of the first graphs. The operations additional can comprise determining cut-off values based on p-th percentiles of density for the first graphs, and identifying recommended variant groups of the candidate item in the nested subclusters of the hierarchy dendrograms below the cut-off values.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although a scalable pipelines for machine learning-based base-variant grouping has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-11 may be modified, and that the foregoing discussion of certain of these embodiments does not necessarily represent a complete description of all possible embodiments. For example, one or more of the procedures, processes, or activities of FIGS. 4-7, 10, and 11 may include different procedures, processes, and/or activities and be performed by many different modules, in many different orders and/or one or more of the procedures, processes, or activities of FIGS. 4-7, 10, and 11 may include one or more of the procedures, processes, or activities of another different one of FIGS. 4-7, 10, and 11. As another example, the systems within system 300 and/or variant group system 310 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable media storing computing instructions that, when executed on the one or more processors, perform operations comprising:

generating text embeddings of the candidate items using a first pre-trained Siamese neural network and a first contrastive loss function; and converting the text embeddings to first N-dimensional feature embeddings, wherein the first N-dimensional feature embeddings comprise encoded vector representations of the candidate items used to compute similarity between the candidate items for variant grouping;

generating an adjacency list for candidate items using a distance threshold with a maximum allowable neighbor distance equal to a Siamese model cut-off, wherein the distance threshold is determined using a union logic for pairs of the candidate items;

loading data for the candidate items in the adjacency list;

generating graphs of the candidate items in the adjacency list;

determining, using breakdown logic, first graphs of the graphs that exceed a predetermined size;

building hierarchy dendrograms of nested subclusters of the first graphs;

determining cut-off values based on p-th percentiles of density for the first graphs;

identifying recommended variant groups of the candidate items in the nested subclusters of the hierarchy dendrograms below the cut-off values; and presenting the recommended variant groups on electronic media used for online ordering.

2. The system of claim 1, wherein the operations further comprise, before generating the adjacency list:

generating image embeddings of the candidate items using a second pre-trained Siamese neural network; and flattening an output from a second pre-trained Siamese neural network to second N-dimensional feature embeddings comprising numeric vector representations of the candidate items used to predict whether the candidate items are variants of one another.

3. The system of claim 2, wherein the operations further comprise:

indexing, using a similarity search algorithm, item embeddings in a feature space for retrieval of N nearest neighbors of the candidate items.

4. The system of claim 3, wherein the similarity search algorithm is Facebook Artificial Intelligence Similarity search (FAISS).

5. The system of claim 1, wherein generating the adjacency list further comprises:

for each of the candidate items, determining respective nearest neighbors of each of the candidate items based on a respective pre-trained Siamese neural network model threshold generated for each of the candidate items.

6. The system of claim 1, wherein the predetermined size is 5000.

7. The system of claim 1, wherein the cut-off values are inversely proportional to sizes of the first graphs.

8. The system of claim 1, wherein building the hierarchy dendrograms of the nested subclusters further comprises sorting respective linkage distances between item embeddings of the candidate items of pairs of the candidate items for each of the first graphs.

9. The system of claim 1, wherein nodes of the graph correspond to candidate item identifiers, edges between the nodes of the graph correspond to predictions that candidate items associated with the candidate item identifiers are candidate item variants, and lengths of the edges correspond to pair distances between text and image embeddings corresponding to the candidate items.

10. The method of claim 1, wherein nodes of the graph correspond to candidate item identifiers, edges between the nodes of the graph correspond to predictions that candidate items associated with the candidate item identifiers are candidate item variants, and lengths of the edges correspond to pair distances between text and image embeddings corresponding to the candidate items.

11. A method being implemented via execution of computing instructions configured to run on one or more processors and stored at one or more non-transitory computer-readable media, the method comprising:

generating text embeddings of the candidate items using a first pre-trained Siamese neural network and a first contrastive loss function; and converting the text embeddings to first N-dimensional feature embeddings, wherein the first N-dimensional feature embeddings comprise encoded vector representations used to compute similarity between the candidate items for variant grouping;

generating an adjacency list for candidate items using a distance threshold with a maximum allowable neighbor distance equal to a Siamese model cut-off, wherein the distance threshold is determined using a union logic for pairs of the candidate items;

loading data for the candidate items in the adjacency list;

generating graphs of the candidate items in the adjacency list, wherein nodes of the graphs represent the candidate items and wherein edges of the graphs represent predicted variant neighbor links between pairs of the candidate items;

determining, using breakdown logic, first graphs of the graphs that exceed a predetermined size;

building hierarchy dendrograms of nested subclusters of the first graphs;

determining cut-off values based on p-th percentiles of density for the first graphs;

identifying recommended variant groups of the candidate item in the nested subclusters of the hierarchy dendrograms below the cut-off values; and presenting the recommended variant groups on electronic media used for online ordering.

12. The method of claim 11 further comprising, before generating the adjacency list:

generating image embeddings of the candidate items using a second pre-trained Siamese neural network; and flattening an output from a second pre-trained Siamese neural network to second N-dimensional feature embeddings comprising numeric vector representations used to predict whether the candidate items are variants of one another.

13. The method of claim 12 further comprising:

indexing, using a similarity search algorithm, item embeddings in a feature space for retrieval of N nearest neighbors of the candidate items.

14. The method of claim 13, wherein the similarity search algorithm is Facebook Artificial Intelligence Similarity search (FAISS).

15. The method of claim 11, wherein generating the adjacency list further comprises:

for each of the candidate items, determining respective nearest neighbors of each of the candidate items based on a respective pre-trained Siamese neural network model threshold generated for each of the candidate items.

16. The method of claim 11, wherein the predetermined size is 5000.

17. The method of claim 11, wherein the cut-off values are inversely proportional to sizes of the first graphs.

18. A non-transitory computer-readable medium storing instructions, wherein the instructions, upon execution by a processor, cause the processor to perform operations comprising:

generating text embeddings of the candidate items using a first pre-trained Siamese neural network and a first contrastive loss function; and converting the text embeddings to first N-dimensional feature embeddings, wherein the first N-dimensional feature embeddings comprise encoded vector representations used to compute similarity between the candidate items for variant grouping;

generating an adjacency list for candidate items using a distance threshold with a maximum allowable neighbor distance equal to a Siamese model cut-off, wherein the distance threshold is determined using a union logic for pairs of the candidate items;

loading data for the candidate items in the adjacency list;

generating graphs of the candidate items in the adjacency list;

determining, using breakdown logic, first graphs of the graphs that exceed a predetermined size;

building hierarchy dendrograms of nested subclusters of the first graphs using respective linkage distances between item embeddings of the candidate items of pairs of the candidate items of the first graphs;

determining cut-off values based on p-th percentiles of density for the first graphs;

identifying recommended variant groups of the candidate item in the nested subclusters of the hierarchy dendrograms below the cut-off values; and presenting the recommended variant groups on electronic media used for online ordering.

19. The non-transitory computer-readable medium of claim 18 storing further instructions, wherein the further instructions, upon execution by a processor, cause the processor to, before generating the adjacency list:

generate image embeddings of the candidate items using a second pre-trained Siamese neural network; and flatten an output from a second pre-trained Siamese neural network to second N-dimensional feature embeddings comprising numeric vector representations used to predict whether the candidate items are variants of one another.

20. The non-transitory computer-readable medium of claim 19 storing further instructions, wherein the further instructions, upon execution by a processor, cause the processor to index, using a similarity search algorithm, item embeddings in a feature space for retrieval of N nearest neighbors of the candidate items.

\* \* \* \* \*